United States Patent [19] | [11] Patent Number: 4,729,102
Miller, Jr. et al. | [45] Date of Patent: Mar. 1, 1988

[54] AIRCRAFT DATA ACQUISITION AND RECORDING SYSTEM

[75] Inventors: Lawrence D. Miller, Jr., Redmond; Robert J. Owen, Mercer Island; Richard M. Kiltz, Maple Valley, all of Wash.

[73] Assignee: Sundstrand Data Control, Inc., Redmond, Wash.

[21] Appl. No.: 664,157

[22] Filed: Oct. 24, 1984

[51] Int. Cl.$^4$ .......................... G11B 5/02; G06F 15/74

[52] U.S. Cl. .......................................... 364/424; 360/5; 369/21

[58] Field of Search ............... 364/424, 450, 451, 442, 364/900, 431.04; 360/5, 31; 369/21; 73/489

[56] References Cited

U.S. PATENT DOCUMENTS

| | | | |
|---|---|---|---|
| 4,072,850 | 2/1978 | McGlynn | 364/424 |
| 4,188,618 | 2/1980 | Weisbart | 364/442 X |
| 4,258,421 | 3/1981 | Jahasz et al. | 364/424 |
| 4,266,274 | 5/1981 | Barman | 364/431 |
| 4,267,569 | 5/1981 | Baumann et al. | 364/431 |
| 4,271,402 | 6/1981 | Kastura et al. | 340/52 |
| 4,325,123 | 4/1982 | Graham et al. | 364/431.07 |
| 4,394,742 | 7/1983 | Crummer et al. | 364/431 |
| 4,409,670 | 10/1983 | Herndon et al. | 364/900 |
| 4,470,116 | 9/1984 | Ratchford | 364/424 |

OTHER PUBLICATIONS

"Gathering and Analysing Data on the British Airways Boeing 757 Aircraft.", Waller, Sep. 81, pp. 381-393.
"Solid State Crash Survivable Flight Data Recorders for Mishap Investigation", H. R. Ask, Sep. 81, pp. 33-68, Symposium Aircraft Integrated Data Systems.
"An Intermediate Solution Between Basic and Expanded A.I.D.S.", Robert, Sep. 81, pp. 277-300, Symposium Aircraft Integrated Data Systems.

*Primary Examiner*—Errol A. Krass
*Assistant Examiner*—Thomas G. Black
*Attorney, Agent, or Firm*—Christensen, O'Connor, Johnson & Kindness

[57] ABSTRACT

Disclosed is a combined flight data recorder data aquisition circuitry (10) and airborne integrated data circuitry (12) that can be variously packaged to supplement and update existing aircraft systems or serve as a standalone flight data recording and/or airborne integrated data system. The flight data recorder system circuitry (10) and airborne integrated data system circuitry (12) are separately programmed microprocessor based systems that are capable of processing aircraft parametric signals provided by a variety of aircraft signal sources. In the disclosed arrangement, the airborne integrated data system circuitry (12) is arranged and programmed to automatically monitor engine start and shutdown procedures, aircraft takeoff and cruise and to provide a landing report that indicates fuel consumption and landing weight. To minimize memory storage requirements and provide readily available engine condition information, the automatic monitoring consists of a single set of signals for each monitored condition and the information is converted to standard engineering units. Monitoring of selected parametric signals to detect excessive levels also is provided. Stored data is periodically retrieved by means of a ground readout unit (30).

25 Claims, 8 Drawing Figures

AIRCRAFT DATA ACQUISITION AND RECORDING SYSTEM

TECHNICAL FIELD

This invention relates to apparatus for monitoring and recording aircraft flight parameters both for providing a record of selected flight data and for providing performance and maintenance information.

BACKGROUND OF THE INVENTION

Aircraft flight and performance parameters are monitored and recorded for various reasons and purposes. Two specific purposes, which are addressed by this invention, are the recording of primary flight parameters for retrieval and analysis in the event of an aircraft mishap or crash and the recording and analysis of various aircraft flight and performance parameters to assist in aircraft maintenance and to monitor both aircraft and crew performance.

In the prior art, the systematic monitoring and recording of primary flight parameters for retrieval and analysis in the event of an aircraft mishap or crash takes several forms. With respect to transport aircraft that are operated for commercial purposes, primary flight parameters that are useful in determining the cause of an aircraft mishap or crash initially were recorded in analog form by a flight data recorder that utilized a moving band of metal foil. In such a device, indentations are formed in the metal foil to indicate the value of each recorded parameter as a function of time. Generally, because of standards set by various regulatory agencies and commercial aviation trade associations, this type of flight data recorder provided a record of five flight parameters, including indicated air speed, altitude, vertical acceleration, heading and time. As the related arts advanced, flight data recorders were developed wherein the monitored analog signals are converted to a digital signal format and recorded on magnetic tape, instead of metal foil. Although such digital flight data recorders have specific advantages over prior art foil-type flight data recorders, the various regulatory agencies did not require the replacement of foil-type flight data recorders, mandating only that digital flight data recorders be utilized on aircraft that were certified for commercial use after a certain date. For example, in the United States, foil-type flight data recorders may still be utilized on each type of aircraft that was certified prior to September 1969 relative to usage in carrying passengers. Since various air frame manufacturers have periodically introduced new versions of such aircraft and because of the cost involved in replacing foil-type flight data recorders with digital flight data recorders, a significant portion of the aircraft employed by commercial carriers still employ foil-type data recorders.

Additional advances in the related technical arts have motivated both industry initiated and mandatory advances in the design and construction of digital flight data recorders. In this regard, through regulatory action and standardization efforts of various air carrier organizations, digital flight data recorder systems have been made available that record more than the above discussed five primary flight parameters. For example, in the United States and other countries, it is mandatory that each type of passenger carrying aircraft that was certified after September 1969 be equipped with a digital flight data recorder capable of recording at least sixteen parameters.

As a result of the above discussed evolution of flight data recorder technology and the issuance of various mandatory requirements, aircraft in current operation utilize a mixture of the various types of prior art flight data recorder systems. This presents several disadvantages and drawbacks. Firstly, in many cases it has not been economically feasible for the air carriers to replace the older types of flight data recorders with flight data recording systems that are capable of monitoring and recording at least 16 flight parameters. Since many air carriers operate numerous types of aircraft, it has been necessary that such air carries maintain and service various types of flight data recorder systems. Secondly, because the prior art has not provided a cost effective solution to equipping all aircraft with flight data recorders that monitor and record at least sixteen flight data parameters, regulatory agencies and air carrier associations have not required replacement of older type flight data recorders. However, the need and desire for improved aircraft accident investigation aids has resulted in recommendations by various U.S. and international organizations and agencies that would make replacement of older type flight data recorders mandatory.

Advances in the flight data recording arts and concomitant advances in the data processing arts has resulted in growing interest in collecting and analyzing various aircraft flight and performance parameters to assist both in aircraft maintenance and to monitor aircraft and crew performance. The objectives of such monitoring and analysis vary somewhat between the various air carriers and other interested parties and range from simply maintaining an extensive record of the recorded flight parameters for use in the event of an aircraft mishap or crash to comprehensive analysis of the data to provide short term and/or long term maintenance and logistic planning activities. As is known in the art, if economically feasible, the collection and analysis of such data can be extremely beneficial in both short term and long term aircraft maintenance and planning. For example, if the recorded data can be rapidly analyzed and made available to flight line maintenance personnel, the time required to identify and replace a faulty component can be substantially reduced to therby prevent or minimize disruptions in aircraft departure and arrival schedules. In the longer term, such monitoring and analysis can be useful in identifying gradual deterioration of an aircraft system or component, thereby permitting repair or replacement at a time that is both convenient and prior to actual failure. In addition, both the short term and long term monitoring and analysis of various flight parameters can be useful to flight crews and the carriers relative to establishing and executing flight procedures that result in reduced fuel consumption. Even further, such monitoring and analysis can yield information as to whether established procedures are resulting in the expected aircraft performance and efficiency and whether the flight crew is implementing a desired procedure.

Systems for collecting and analyzing flight data parameters to assist in aircraft maintenance and to monitor aircraft and crew performance are generically referred to airborne integrated data systems ("AIDS") and have taken various forms. various forms. In this regard, the simplest system basically includes a recorder that records each flight parameter recorded by the aircraft digital flight data recorder system. In this type of system, the flight data information is recorded on a magnetic tape that is periodically removed and sent to a ground based data processing station for subsequent computer analysis. In other somewhat more complex systems, provision is made for recording various flight parameters that are not collected by the aircraft digital flight data recorder. In some of these more complex arrangements, a data management unit and flight deck printer are provided. The data management unit permits the flight crew to selectively and intermittently activate the integrated data system during relevant portions of a flight or whenever a problem is suspected. Although the use of data management units eliminates or minimizes the recording of irrelevant data, successful system operation becomes dependent upon the flight crews ability to operate the system. In some situations, tending to higher priority tasks can prevent the flight crew from executing the procedures necessary to record relevant data information. Further, although inclusion of a flight deck printer can provide flight line personnel with timely data that is relevant to aircraft maintenance and repair procedures, currently available systems do not provide such data in a readily usable form.

Each above discussed implementation of an airborne integrated data system has distinct disadvantages and drawbacks. In this regard, systems that simply duplicate the information recorded by the flight data recorder system and those that simply record additional flight parameters do not provide data that can be utilized by flight line personnel. On the other hand, the more complex implementations of an airborne integrated data system are relatively expensive and are relatively heavy. Thus, although aircarriers recognize the benefits of such systems, the general attitude has been that the benefits are outweighed by the costs and weight penalties involved. Further wide spread use of airborne integrated data systems has been impeded because such systems generally must be specifically configured for each type of aircraft and, in many cases, for configuration variations within a particular type of aircraft. It is not unusual for a particular air carrier to operate various types of aircraft and to equip any given type of aircraft with various alternative systems and components. The airborne integrated data systems that have been proposed by the prior art are not readily adaptable to the various types of aircraft and alternative system configurations utilized in such aircraft, thereby further complicating the situation.

SUMMARY OF THE INVENTION

The present invention provides a data acquisition and recording system that is configured and arranged to: (a) serve as a supplementary data acquisition unit that operates in conjunction with prior art flight data recorder systems to expand the monitoring and recording capability of the prior art system; or (b) alternatively serve as a stand alone data acquisition unit that replaces a prior art flight data recorder data acquisition unit; or (c) alternatively serve as an airborne integrated data system that operates in conjunction with an existing flight data recorder system to automatically collect and analyze parametric aircraft data so as to provide readily available and useful maintenance and performance information; or (d) provide both an airborne integrated data system that is capable of providing readily available and useful maintenance and performance information and a data acquisition unit for supplying digitally encoded signals suitable for recording within a flight data recorder unit. To provide these alternative operating configurations at minimum cost and with minimum weight penalty, the invention in effect is partitioned into flight data acquisition circuitry that monitors primary aircraft parameters and provides digitally encoded signals to a prior art type digital flight recorder unit and airborne integrated data system circuitry that monitors and processes additional signals to provide maintenance and performance information. This partitioning permits the invention to be realized as a "family" of flight data acquisition and airborne integrated data systems. For example, in those situations wherein only a supplemental flight data acquisition unit is required for expanding the parameter recording capability of a prior art flight data recorder system or wherein a miniature stand along flight data acquisition unit is required for replacing a prior art flight data recorder data acquisition unit, the invention can be packaged without the airborne integrated data system circuitry. Conversely, in situations wherein an aircraft is equipped with a flight data recorder system that is capable of recording an extensive parameter list, the airborne integrated data system circuitry can be separately packaged and installed to operate in conjunction with the existing flight data recorder system. In situations such as equipping a new aircraft, both the circuitry for providing ditially encoded flight data recorder system signal acquisition and the airborne integrated data system circuitry can be housed in a single unit.

To provide the above discussed flexibility in packaging and configuration, the flight date recorder data acquisition circuitry are configured in a similar manner and include a number of substantially identical circuits. In this regard, both the airborne integrated data system circuitry and the flight data recorder data acquisition circuitry include a microprocessor based central processing unit (CPU). As is known to those skilled in the art, such a CPU includes an arithmetic/logic unit that is interconnected with a random access memory (RAM) and a read only memory (ROM). In accordance with the invention, the ROM utilized in the flight data recorder data acquisition circuitry stores the program or instructions required for monitoring the signal sources that provide the parametric aircraft data to be recorded in the fligh data recorder unit and a program that causes the associated CPU to digitally encode the monitored signals. The ROM of the airborne integrated data systems circuitry stores a separate program for monitoring and analyzing parametric signals in a manner that provides desired performance or maintenance information. Preferably, at least a portion of the airborne integrated data system circuitry ROM is electronically alterable (e.g., consists of an electronically erasable, programmable read only memory) so that the airborne integrated data system circuitry can be readily adapted to a particular aircraft configuration and can be adapted to provide various performance and maintenance related information. Configuring the CPUs in this manner allows the airborne integrated data system circuitry to be operated in a manner that satisfies the needs and desires of each air carrier. Further, provision of a separate CPU in the airborne integrated data circuitry and the flight data recorder data acquisition circuitry results in increased reliability since the operational state of the flight data recorder data acquisition is not dependent on the operational state of the airborne integrated data system circuitry.

In addition to including substantially identical (but differently programmed) CPUs, the flight data recorder data acquisition circuitry and the airborne integrated data system circuitry include substantially identical data acquisition units that acquire and process a set of parametric signals under the control of the associated CPU. In accordance with the invention, each data acquisition unit is configured and arranged for monitoring and processing various analog signals (including single and multiphase alternating current signals and ratiometric signals) and discrete data signals that assume one of two predetermined levels. In this regard, the data acquisition units utilized in the invention are configured to provide a number of "universal" input channels that can be connected to a wide variety of analog and discrete signal sources with the associated CPU being programmed to adapt each input channel to the particular type of signal source. Further, the two previously discussed CPUs are programmed to control signal scaling and analog to digital signal conversion that is effected by the associated data acquisition units so that the flight data recorder acquisition circuitry provides the aircraft flight data recorder unit with an appropriately formatted digitally encoded signal and the airborne integrated data system circuitry provides a digitally encoded signal that is representative of the desired performance or maintenance information.

In addition to including CPUs and data acquisition circuitry of substantially identical configuration, the flight recorder data acquisition circuitry and the airborne integrated data system circuitry include similarly configured interface units that permit each set of circuitry to obtain parametric data from appropriate digital signal sources. This provision allows both the flight recorder data acquisition-circuitry and the airborne integrated data system circuitry to obtain appropriate digitally encoded signals from existing aircraft systems, rather than independently monitoring and processing the signals that are supplied to those existing systems.

In the disclosed embodiments of the invention, the airborne integrated data system circuitry is programmed and sequenced to perform engine condition monitoring and to detect occurrence of various other flight conditions that exceed desired limits. With respect to engine condition monitoring, the disclosed embodiments of the invention automatically and selectively collect pertinent parametric data during engine start and shut down procedures, during take off procedures and when the aircraft reaches stabilized cruise. In addition, in the disclosed embodiments, a landing report is generated at the conclusion of each flight leg to indicate the initial aircraft total gross weight, the gross weight at touch down, and the fuel consumed by each engine during that particular flight leg. In addition, the disclosed embodiments of the invention allow the flight crew to manually initiate the recording of a set of engine condition parameters whenever it is believed that a condition is present that may be of interest to ground personnel.

In addition to providing the above mentioned automatic and manually initiated engine condition monitoring, the disclosed embodiments of the invention provide exceedance monitoring wherein important engine parameters (e.g., signals that indicate engine deterioration) are monitored to detect operation outside of prescribed limits. In the exceedance monitoring that is performed by the invention, two limit values or thresholds are employed. When the monitored parameter reaches the first or primary limit a set of digital signals is provided that indicates the time at which the primary limit was reached and the value of selected, associated parameters at that time. In addition, digital signals are provided that indicate the value of the monitored parameter and the selected, associated parameters at instants of time that are prior to the time at which the monitored parameter reaches the primary limit (4, 8 and 12 seconds prior to exceedance in the disclosed embodiment). Further, in the exceedance monitoring arrangement of the invention, if the monitored parameter reaches the specified secondary limit, additional digital signals are provided at the secondary limit point and when the monitored parameter reaches its peak value. In the event that the value of the monitored parameter varies above and below the primary or secondary limits, additional digital signals are provided at each limit crossing.

In accordance with the invention, the occurrence of various events other than engine parameter exceedances can be detected by the exceedance monitoring arrangement of the airborne integrated data system circuitry. For example, appropriate aircraft sensors can be monitored to detect excessively high or low vertical acceleration, excessive air speed prior to landing, descent rates that exceed a preselected value, changes in aircraft heading at rates that exceed desired limits, excessive altitude loss during climb out procedures, and various other conditions that are useful in determining both aircraft performance and the execution of various maneuvers.

As can be noted from the above discussion of exceedance monitoring, in accordance with this invention, digital signals representative of performance and condition are supplied at selected times, rather than being produced continuously. This minimizes the amount of data collected while simultaneously providing the required or desired information. Further, in accordance with the invention, the CPU of the airborne integrated data system circuitry processes the monitored parameters to provide the information in a form that is easily understood by flight line and maintenance personnel. In this regard, the digital signals supplied by the invention are representative of the value of a monitored parameter expressed in standard engineering units, rather than the value of the signal provided by the associated sensors. For example, in monitoring air speed and oil temperature, the CPU is sequenced to convert the related sensor signals to values that are expressed in knots and degrees, rather than simply providing digital signals that represent the signal levels provided by the sensors.

In accordance with the invention, the digital signals provided by the airborne integrated data system circuitry are stored in a nonvolatile memory device for retrieval by ground personnel and/or are transmitted to ground stations while the aircraft is in flight. In embodiments in which the airborne integrated data systems information is stored in a nonvolatile memory unit, the information is extracted by means of a ground read out unit that is operated by flight line or maintenance personnel. In the disclsed embodiments of the invention, the ground read out unit preferably is a commericially available, hand held computer that accesses the nonvolatile memory via a conventional data port. Depending on the desires and needs of the air carrier, such a hand held computer can be operated in conjunction with a cassette recorder and/or modem for transferring the stored data to a central processing facility for its addition to a collective data base that it can be useful in performing more complex engine performance analyses or to detect gradual deterioration or "trends." In addition, the hand held computer (or a more specifically configured ground read out unit) preferably includes a small printer than provides a record of the monitored engine conditions and exceedances for use by ground personnel relative to locating reported faults and/or accomplishing more routine maintenance and service of the aircraft.

BRIEF DESCRIPTION OF THE DRAWING

These and other aspects and advantages of the invention will be recognized by reference to the following detailed description of an illustrative embodiment, taken in conjunction with the drawing in which.

DETAILED DESCRIPTION

Figure 1:
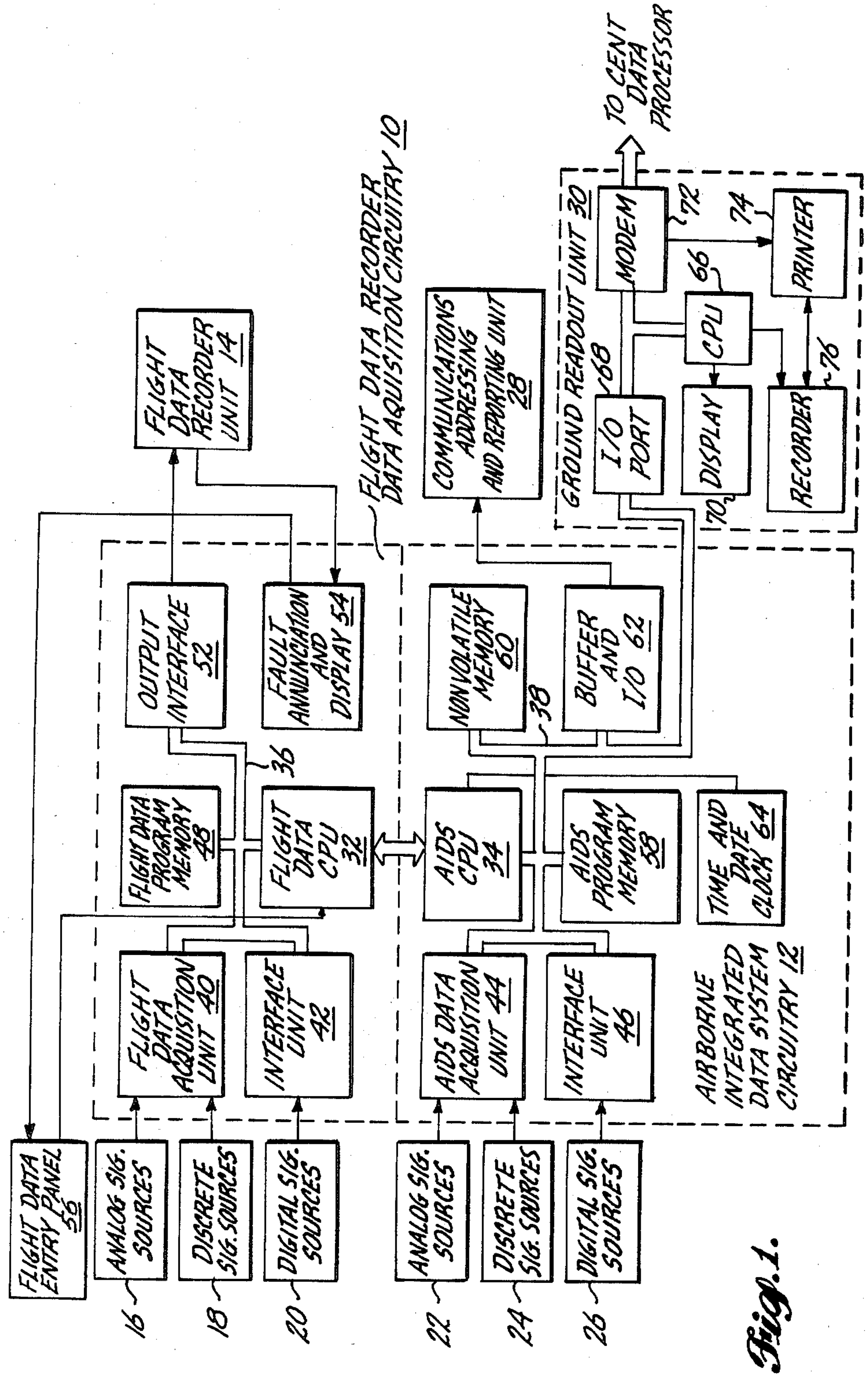
FIG. 1 is a block diagram that illustrates a flight data recorder system and an airborne integrated data system that employs the present invention.

The block diagram of FIG. 1 illustrates a flight data recorder system and an airborne integrated data system that utilizes combined flight data recorder data acquisition circuitry 10 and airborne integerated data system circuitry 12 constructed in accordance with this invention. In addition to flight data recorder data acquisition circuitry 10, the depicted flight data recorder system includes a flight recorder unit 14 for storing digitally encoded parametric data that is useful in determining the cause of various aircraft mishaps, including crashes. Various types of flight data recorder units that are suitable for use with the present invention are known in the art and generally employ a magnetic tape unit that is contained within an environmental enclosure that is constructed to withstand penetration and exposure to high temperature. As is indicated by the blocks denoted by the numerals 16, 18 and 20, respectively, the parametric data supplied to flight recorder data acquisition circuitry 10 includes analog data signals, discrete data signals and digitally encoded data signals. As is known in the art, analog signals typically utilized by a flight data recorder system include signals such as 3-phase alternating current signals (i.e., "synchro signals") representative of flight parameters such as aircraft heading and the position of various control surfaces; ratiometric signals such as signals that represent the linear displacement of various aircraft control surfaces that are provided by linear variable differential transformers; and various other time varying signals representative of the current state of aircraft attitude or control relationship. Discrete data signals are signals that assume one of two predeterined levels (i.e., "on" or "off"; "high" or "low"). As is known in the art, discrete signals that are useful in flight data recorder systems are supplied by a variety of sources including switches that are manually or automatically operated to provide signals representative of the funcational state of the aircraft (or an aircraft system) and signals that indicate the presence of a crew initiated command. Digitally encoded parametric signals that are utilized by flight data recorder systems generally are obtained from other system within the aircraft. For example, when the particular aircraft employing flight data recorder data acquisition circuitry 10 includes a navigation computer or flight management system it is generally advantageous to utilize signals generated by those systems, rather than separately processing the signals supplied by additional signal sources or the signal sources that are associated with the navigation computer or flight management system.

As is indicated by boxes 22, 24 and 26, respectively, of FIG. 1, analog, discrete and digitally encoded signals are also provided to airborne integrated data system circuitry 12 of the depicted airborne integrated data system. In addition to signal sources for providing the signals, the airborne integrated data system of FIG. 1 includes a communications addressing and reporting unit 28 and a ground readout unit 30. As shall be described in more detail hereinafter, communications addressing and reporting unit 28 can be employed in embodiments of the invention wherein the digitally encoded signals supplied by airborne integrated data systems circuitry 12 are to be transmitted while in flight to ground stations for evaluation and analysis. Various apparatus can be utilized as communications addressing and reporting unit 28. For example, the currently preferred embodiments of the invention employ equiement that is manufactured to Aeronautical Radio Inc. (ARINC) Characteristic/429 and commonly known as "ACARS," which is a trademark of Aeronautical Radio Inc. As shall be described in more detail hereinafter, ground readout unit 30 is preferably a conventional portable computer (and standard peripheral devices) which permits extraction of performance and maintenance information that is derived by and stored in airborne integrated data systems circuitry 12.

Turning now to flight recorder data acquisition circuitry 10 and airborne integrated data system circuitry 12 of FIG. 1, it can be noted that substantial similarity exists between the two sets of circuitry relative to basic circuit topology. More specifically, both flight data recorder data acquisition circuitry 10 and airborne integrated data system circuitry 12 are microprocessor based circuit arrangements with flight data acquisition circuitry 10 including a processing unit identified as flight data CPU 32 in FIG. 1 and airborne integrated data system circuitry 12 including a processing unit identified as AIDS CPU 34. Both flight data CPU 32 and AIDS CPU 34 are interconnected to an information and addressing bus (36 in flight recorder data acquisition circuitry 10 and 38 in integrated data system circuitry 12). As is indicated in FIG. 1 the respective information and addressing buses interconnect flight data CPU 32 and AIDS CPU 34 with data acquisition units and interface units (flight data acquisition unit 40 and interface unit 42 in circuitry 10 and AIDS data acquisition unit 44 and interface unit 46 in circuitry 12). As also in indicated in FIG. 1, information bus 36 couples flight data CPU 32 to a flight data program memory 48 and information and addressing bus 38 couples CPU 34 to an AIDS program memory 50. In this arrangement, flight data CPU 32 functions to control flight data acquisition 40 and interface unit 42 for the accessing of data that is to be processed and stored in flight data recorder unit 14. In a similar manner, AIDS CPU 34 functions to control AIDS data acquisition unit 44 and interface unit 46 for the accessing of data to be processed and either stored in airborne integrated data system circuitry 12 or transmitted to a ground station via communications addressing and reporting unit 28.

More specifically, flight data acquisition unit 40 and AIDS data acquisition unit 44 operate under the control of flight data CPU 32 and AIDS CPU 34, respectively with flight data acquisition unit 40 being connected to receive the signals supplied by analog signal sources 16 and discrete signal sources 18 and with AIDS data acquisition unit 44 being connected to receive the signals supplied by analog signal sources 22 and discrete signal sources 24. In accordance with the invention, flight data acquisition unit 40 and AIDS data acquisition unit 44 are identical circuit arrangements of the type disclosed in U.S. patent application Ser. No. 576,538, filed Feb. 3, 1984. That patent applicatio being entitled "Data Acquisition System," and being assigned to the assignee of the invention disclosed herein. As shall be described in more detail relative to FIG. 3, flight data acquisition unit 40 and AIDS data acquisition unit 44 provide gain scaling and analog-to-digital (A-D) conversion wherein flight data CPU 32 and AIDS CPU 34 supply flight data acquisition unit 40 and AIDS data acquisition unit 44 with a signal selection command; flight data acquisition unit 40 and AIDS data acquisition unit 44 respond by sampling the selected analog or discrete signal, convert the selected signal to an appropriate digital format and provide flight data CPU 32 and AIDS CPU 34 with an interrupt signal via the respective information and address buses 36 and 38. Upon receipt of such an interrupt signal, flight data CPU 32 and AIDS CPU 34 sequence to access the digitally encoded signals provided by flight data acquisition unit 40.

Operation of flight data CPU 32 and AIDS CPU 34 with interface unit 42 and interface unit 46 is similar to the above described operation of the CPUs with respect to flight data acquisition unit 40 and AIDS data acquisition unit 44. In this regard, interface unit 42 and interface unit 46 are conventional digital circuit arrangements that permit flight data recorder data acquisition circuitry 10 and airborne integrated data system circuitry 12 to utilize digitally encoded signals that are supplied by existing aircraft systems. For example, in some situations it will be advantageous to utilize digitally encoded signals that are supplied by existing navigation systems or flight management systems instead of utilizing flight data acquisition unit 40 and/or AIDs data acquisition unit 44 to independently develop equivalent digitally encoded signals. Further, as shall be described in more detail relative to FIGS. 2A–2C, interface units 42 and 46 permit flight recorder data acquisition circuitry 10 and airborne integrated data system circuitry 12 of FIG. 1 to be used in a manner that extends the capabilities of prior art flight data recorder systems. As is known to those skilled in the art, the nature and format of digitally encoded signals supplied to interface units 42 and 46 will depend on the configuration and operation of the aircraft systems that supply those signals. Thus, the exact structure of interface unit 42 and interface unit 46 depends on the digitally encoded signals that are to be accessed and processed by flight data CPU 32 and AIDS CPU 34. For example, when digitally encoded parallel format signals are to be utilized a conventional multiplex data bus interface can be utilized for interface unit 42 and/or interface unit 46. Such interface units generally include a remote terminal section and a high speed sequential state controller that is programmed to access the desired digital data source, provide any required signal conditioning and store the resultant signal in a random access memory unit that acts as a buffer memory. In this type of arrangement the associated CPU (flight data CPU 32 and/or AIDS CPU 34) is sequenced to transmit data request signals to the associated interface unit via information and addressing bus 36 and/or 38 and to asynchrously access the signals stored in the interface buffer unit. In situations wherein digitally encoded serial data is to be utilized, other conventional interface units can be employed. For example, the arrangements discussed relative to FIGS. 2A–2C, utilize interface units configured in accordance with ARINC (Aeronautical Radio, Inc.) Characteristic 573 and 429.

As also will be recognized by those skilled in the art, various microprocessor based circuits are available for use as flight data CPU 32 and AIDS CPU 34. For example, in embodiments of the invention that are currently being developed and tested, a Z80 microprocessor circuit, mnaufactured by Zilog Corporation is utilized within flight data CPU 32 and AIDS CPU 34. As also will be recognized by those skilled in the art, regardless of the particular microprocessor circuit employed, flight data CPU 32 and AIDS CPU 34 include an arithmetic/logic unit that is interconnected a random access memory (RAM), which are not specifically illustrated in FIG. 1. In addition, each CPU 32 and 34 includes a program memory (flight data program memory 48 in flight recorder data acquisition circuitry 10 and AIDS program memory 50 in airborne integrated data system circuitry 12). Although the program memory of a microprocessor based system is typically a read only memory (ROM), the currently preferred embodiments of this invention utilize a flight data program memory 48 and an AIDS program memory 50 that includes both standard read only memory sections and programmable read only memory sections (e.g., electronically erasable programmable memory or "EEPROM"). In these currently preferred embodiments, program instructions and data that is not dictated by the specific configuration of the aircraft in which the invention is installed and program instructions and data that need not be varied to adapt airborne integrated data system circuitry 12 to the requirements of a particular air carrier are stored in ROM within flight data CPU 32 and AIDS CPU 34. On the other hand, data that, in effect, adapts flight data recorder data acquisition circuitry 10 and airborne integrated data system circuitry 12 to a particular aircraft configuration (e.g., adapts the circuitry to the particular set of analog, discrete and digital signal sources of the aircraft) and data that establishes operation of airborne integrated data system circuitry 12 to meet the needs and desires and the air carrier are stored in EEPROM within flight data CPU 32 and AIDS CPU 34. This permits "programming" the invention to meet conditions imposed by the particular aircraft and, simultaneously, the wishes and desires of the user of the invention. As shall be described in further detail, in the currently preferred embodiments, ground readout unit 30 can be operated to either initially establish various performance and maintenance monitoring conditions that are effected by airborne integrated system circuitry 12 or to change such monitoring parameters if the need arises. For example, in the hereinafter discussed arrangement of airborne integrated data system circuitry 12 for engine condiiton monitoring, it may be desirable to change the value of thresholds employed in monitoring certain engine parameters for exceedances when a new engine is installed or change certain thresholds in accordance with the age of the engine (e.g., hours of operation since last overhaul).

With continued reference to FIG. 1, the primary difference between the arrangement of flight data recorder data acquisition circuitry 10 and airborne integrated data system circuitry 12 is the manner in which the two sets of circuitry are configured to process and store the digitally encoded signals provided by flight data CPU 32 and AIDS CPU 34. Referring first to flight data recorder data acquisition circuitry 10, output data that is supplied by flight data CPU 34 is coupled to an output interface unit 52 by means of data and address bus 36. As is indicated in FIG. 1, digital signals that are to be stored in flight data recorder unit 14 for retrieval in the event of an aircraft mishap or crash are transmitted to flight data recorder unit 14 by output interface 52. In this arrangement, output interface 52 is similar to interface units 42 and 46 in that the configuration of the circuit depends on the arrangement and configuration of the circuit depends on the arrangement and configuration of another system component. In this regard, when a conventional magnetic tape type flight data recorder is utilized for flight data recorder unit 14. Output interface 52 will generally be a serial I/O data port and flight data CPU 32 will control the sequencing of data that is coupled to flight data recorder unit 14. In embodiments in which flight data recorder unit 14 employs a nonvolatile solid state memory, output interface 52 is configured in accordance with the data input requirements of the particular flight data recorder unit. For example, if a flight data recorder unit of the type disclosed in U.S. patent application Ser. No. 577,215, now U.S. Pat. 4,644,494 filed Feb. 6, 1984 (which is assigned to the assignee of the present invention) is employed, output interface 52 includes conventional serial data receivers and transmitters (e.g., integrated circuits of the type known as universal asynchronous receiver-transmitters) to establish duplex communication between flight data CPU 32 and a memory controller that is located within that particular flight data recorder.

In addition to output interface 52, flight data recorder data acquisition circuitry 110 includes a fault annunciation and display unit 54 that is interconnected with flight data CPU 32 and a flight data entry panel 56. Flight data entry panel 56 and fault annunciation and display unit 54 are configured and arranged to provide the flight crew with access to the flight data recorder system and provide fault annunciation and status information. Such arrangements are known in the art and, for example, are specified by ARINC flight data recorder system Characteristic 573. In addition, in the currently preferred realizations of the embodiment of the invention that is depicted in FIG. 1, entry panel 56 is utilized to provide a flight crew-integrated data system interface. For example, with respect to the hereinafter described arrangement of airborne integrated data system circuitry 12 for engine conditioning monitoring, documentary data such as the date of the flight, the flight number and aircraft take off gross weight (TOGW), can be supplied to airborne integrated data system circuitry 12, if such data is not made available by existing aircraft systems. As is indicated in FIG. 1, such data is coupled from flight data CPU 32 to AIDS CPU 34 by means of a data bus 58 (e.g., interconnection of serial I/O data ports of flight data CPU 32 and AIDS CPU 34.

In brief summary, the flight data recorder system portion of the arrangement of FIG. 1 operates as follows. Flight data CPU 32 is sequenced to transmit a series of command signals to flight data acquisition unit 40. Upon receipt of each command signal, data acquisition unit 40 accesses the selected flight data parameter signal (supplied by analog signal sources 16 or discrete signal sources 18) and, under the control of flight data CPU 32 performs gain scaling, and analog-to-digital conversion. Flight data acquisition unit 40 then provides flight data CPU 32 with an interrupt signal that indicates the availablility of a digitally encoded signal that represents the selected flight data parameter. Flight data CPU 32 then provides any required further signal processing, such as converting synchro or LVDT signals to corresponding angle or position signals. Upon the completion of any required further signal processing, flight data CPU sequences to transfer to flight data recorder unit 14 a digitally encoded signal that is representative of the signal to be recorded. As previously noted, any signal conversion or buffering that is required is performed by output interface 52. Upon completion of such a monitoring, analysis and storage sequence, flight data CPU 32 sequences to process the next data parameter signal of interest either by means of flight data acquisition unit 40 or interface unit 42. When a digitally encoded signal representative of the flight parameter to be monitored is available in interface unit 42, flight data CPU sequences to access the signal, performs any necessary additional signal processing and supplies the digitally encoded signal to be recorded to flight data recorder unit 14 via output interface unit 52.

Turning now to completing the description of the airborne integrated data system shown in FIG. 1, the depicted airborne integrated data system circuitry 12 includes a nonvolatile memory unit 60 and a buffer and I/O (Input/Output) 62 that are coupled to AIDS CPU 34 by means of data and address bus 38 and further includes time and date clock 64, which is interconnected with AIDS CPU 34.

Buffer and I/O unit 62 is included in realizations of the invention wherein digitally encoded signals representative of the performance and maintenance information made available by airborne integrated data system circuitry 12 is to be transmitted to a ground station via communications addressing and reporting unit 28. More specifically, airborne integrated system circuitry 12 functions in a manner similar to the above described flight data recorder data acquisition circuitry 10. That is, AIDS CPU 34 repetitively sequences to supply command signals to AIDS data acquisition unit and interface unit 46; receives digitally encoded signals representative of the selected parametric signal; and processes the received digitally encoded signals to provide a digitally encoded output signal. From the functional standpoint, the primary difference between the input and signal processing operations of airborne integrated data system circuitry 12 and flight data recorder data acquisition circuitry 10 is that integrated data system circuitry 12 monitors and analyzes parametric signals to provide digitally encoded signals that are representative of desired maintenance and performance information. When the derived performance and maintenance information is to be transmitted to ground stations, AIDS CPU 34 loads the derived digitally encoded signals into a buffer memory of buffer and I/O unit 62 so that the signals can be made available to communications addressing and reporting unit 28 in a suitable format and when transmission to a ground station is initiated. Thus, it can be recognized that the exact structure and arrangement of buffer and I/O unit 62 is dictated by the configuration and structure of communications addressing and reporting unit 28. For example, an input/output port that is configured in accordance with ARINC 429 is utilized as buffer and I/O unit 62 in the previously mentioned currently preferred embodiments of the invention wherein communications addressing and reporting unit is configured in accordance with the applicable ARINC Characteristic.

Nonvolatile memory unit 60 of airborne integrated data system circuitry 12 is utilized in realizations of the invention wherein the performance and maintenance information derived by AIDS CPU 34 is to be recorded for subsequent retrieval for analysis or use by flight line personnel for maintenance purposes. In operation, AIDS CPU 34 addresses nonvolatile memory 60 to store the digitally encoded output signals in a predetermined sequence in memory unit 60. In the currently preferred embodiments of the invention, nonvolatile memory 60 is a conventionally arranged electronically erasable programmable read only memory (EEPROM). For example, in the hereinafter discussed arrangement of airborne integrated data system circuitry 12 for engine conditioning monitoring, nonvolatile memory 60 is a 64 kilobit EEPROM, which permits storage of engine condition data for up to 45 flight segments.

In the airborne integrated data system arrangement of FIG. 1, data is retrieved from nonvolatile memory 60 by means of ground readout unit 30. As is indicated in FIG. 1, the configuration of ground readout unit 30 corresponds to a small computer system which includes a CPU 66 and input/output port 68 and a display unit 70. In addition, ground readout unit 30 includes one or more peripheral devices for storing, printing or transmitting the maintenance and performance data retrieved from nonvolatile memory 60. As is indicated in FIG. 1, such devices include: a modem 72, which permits the retrieved data to be transmitted via conventional telephone lines to a central data processor (computer) for storage and subsequent analysis; a printer 74, which provides a hard copy record for use by aircraft maintenance personnel; and a cassette type recorder 76 for recording the retrieved performance and maintenance data for subsequent transmittal to a central data processor. Since the storage capacity of conventional magnetic tape cassettes substantially exceeds the storage capacity of nonvolatile memory 60, performance and maintenance data for several aircraft can be combined on a single cassette tape. For example, with respect to the hereinafter discussed engine condition monitoring arrangement of airborne integrated data system circuitry 12, a single cassette can store data from up to ten aircraft.

Arranging the combined flight data recorder system and airborne integrated data system of FIG. 1 in the above-described manner has distinct advantages. One advantage of providing flight data recorder acquisition circuitry 10 that is functionally independent of airborne integrated data systems circuitry 12 is that the operational status of the flight data recorder system does not depend on the operational status of the airborne integrated data system. In this regard, maintaining the flight data recorder system in an operational state is of greater importance than maintaining the airborne integrated data system in an operational state since an operational flight data recorder system is required for each flight. If the flight recorder data acquisition circuitry 10 and airborne integrated data system circuitry 12 of FIG. 1 utilized common CPUs, program memories and/or data acquisition units, the probability of flight data recorder system failure would be higher than that achieved with the arrangement of FIG. 1. This arrangement also provides maximum reliability of the flight data recorder system in that, in the preferred embodiments, ground readout unit 30 does not access flight data CPU 32 or its associated flight data program memory 48.

Figure 2A:
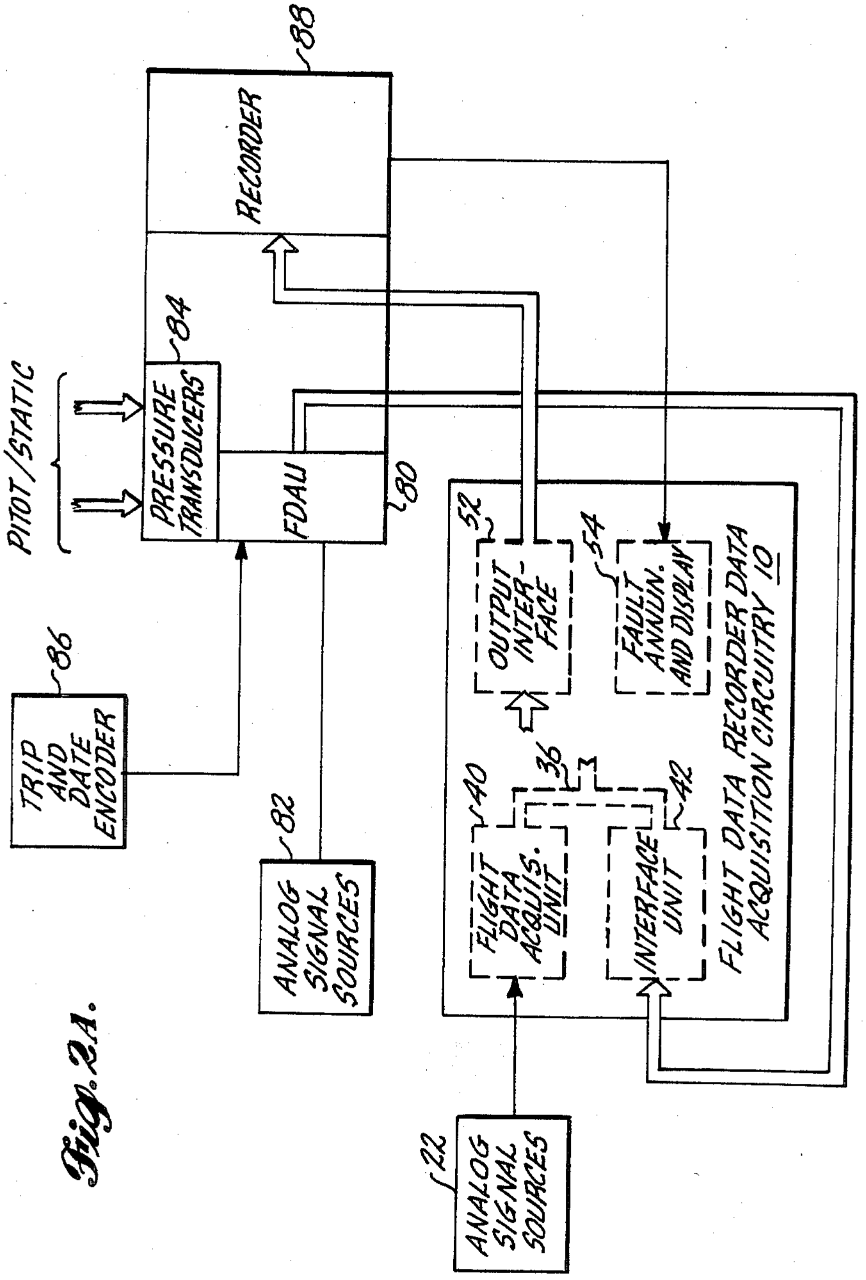
FIG. 2 depicts alternative applications of the invention, with FIG. 2A illustrating an arrangement wherein the invention is employed as a supplementary data acquisition unit for a prior art flight data recording system, FIG. 2B illustrating use of the invention to provide a stand alone flight data acquisition unit for use in a flight data recorder system, and FIG. 2C illustrating use of the invention to provide an airborne integrated data system that is operable in conjunction with an existing aircraft flight data recorder system.

Another advantage of the arrangement of FIG. 1 is that the arrangement provides the basis for a family of flight data recorder acquisition units/airborne integrated data systems that can be utilized to extend the capabilities of prior art flight data recorder systems. In this regard, FIG. 2A schematically illustrates an arrangement wherein flight data recorder data acquisition circuitry 10 of FIG. 10 is utilized to expand the monitoring and recording capability of a prior art flight data recorder system. In the depicted arrangement, the prior art flight data recorder system is an ARINC characteristic 542 digital flight data recorder such as the type E and type F Universal Flight Data Recorder that is manufactured by the assignee of this invention. As is indicated in FIG. 2A, this type of flight data recorder system includes a flight data acquisition unit 80 which receives signals from a set of analog signal sources 82, and a set of pressure transducers 84, with a trip and data coder 86 permitting the flight crew to enter documentary data that serves to identify the recorded data. To expand the data recording capability of the prior art system from 5 parameters to a higher number (e.g., to correspond with 11 or 16 parameter flight data recorder characteristics), the digitally encoded signals representative of the 5 parameters recorded by the prior art are coupled to interface unit 42 of flight data recorder data acquisition circuitry 10. Analog signals representative of the additional parameters to be recorded are coupled to flight data acquisition unit 40. In addition, the output from output interface 52 of digital flight recorder data acquisition circuitry 10 is coupled to the recorder unit of the prior art flight data recorder (88 in FIG. 2A). When the flight data recorder data acquisition circuitry 10 is connected to this manner, flight data CPU 32 is programmed to access the 5 digitally encoded flight data parameters supplied by flight data acquisition unit 80 of the prior art flight data recorder and to supplement that sequence of digital signals with digital signals representing the flight data parameters provided by the analog signal sources 16.

Figure 2B:
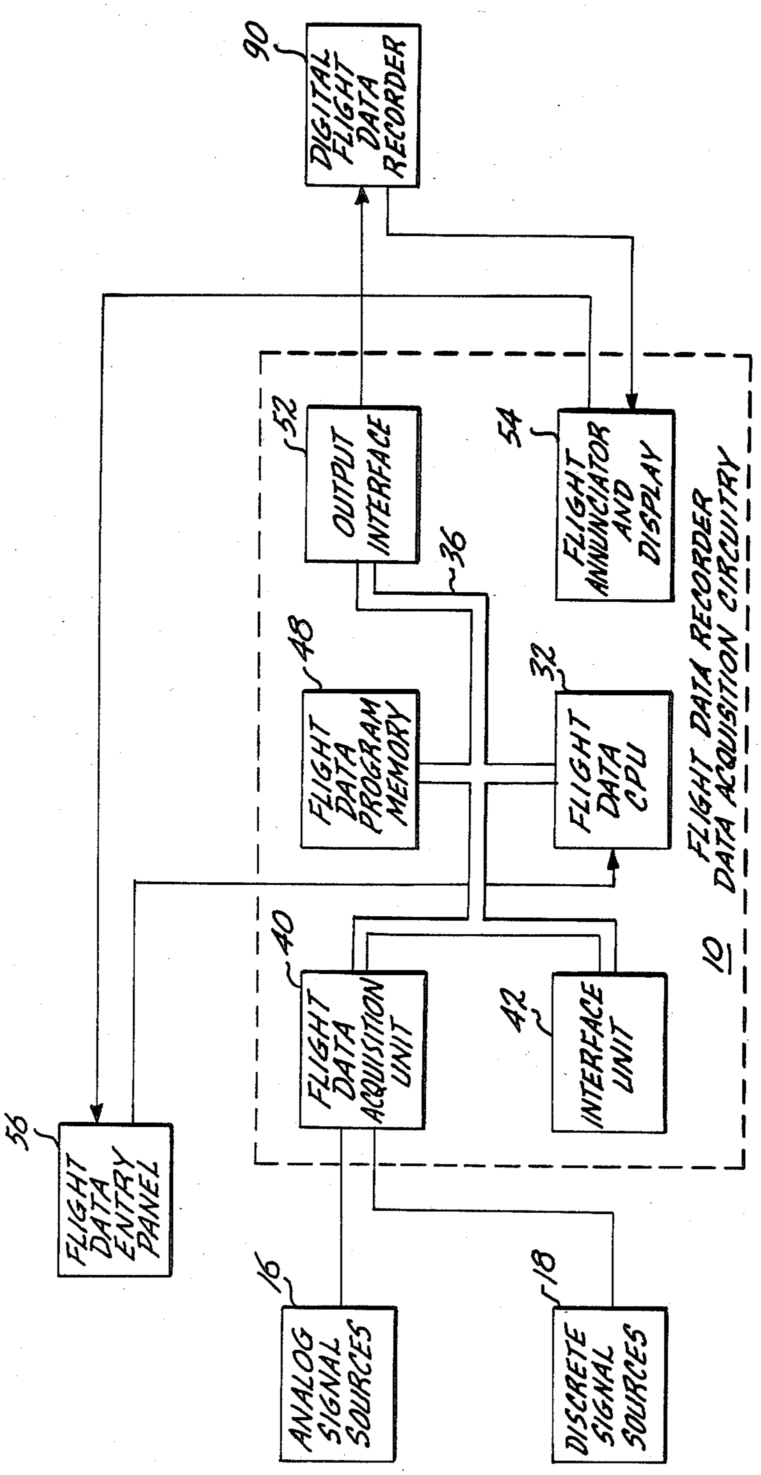

FIG. 2B illustrates flight data recorder data acquisition circuitry 10 connected as a stand-alone flight data acquisition unit. In this arrangement, the analog and discrete signal sources (16 and 18) supply the flight parameters to be recorded and flight data recorder data acquisition circuitry 10 functions in the manner described relative to FIG. 1 to provide the digitally encoded information to a prior art digital data flight recorder 90. Typically, digital flight data recorder 90 is constructed and arranged in accordance with ARINC 573 and the system is operated in conjunction with a data entry panel 92 that is constructed in accordance with that same ARINC Characteristic.

Figure 2C:
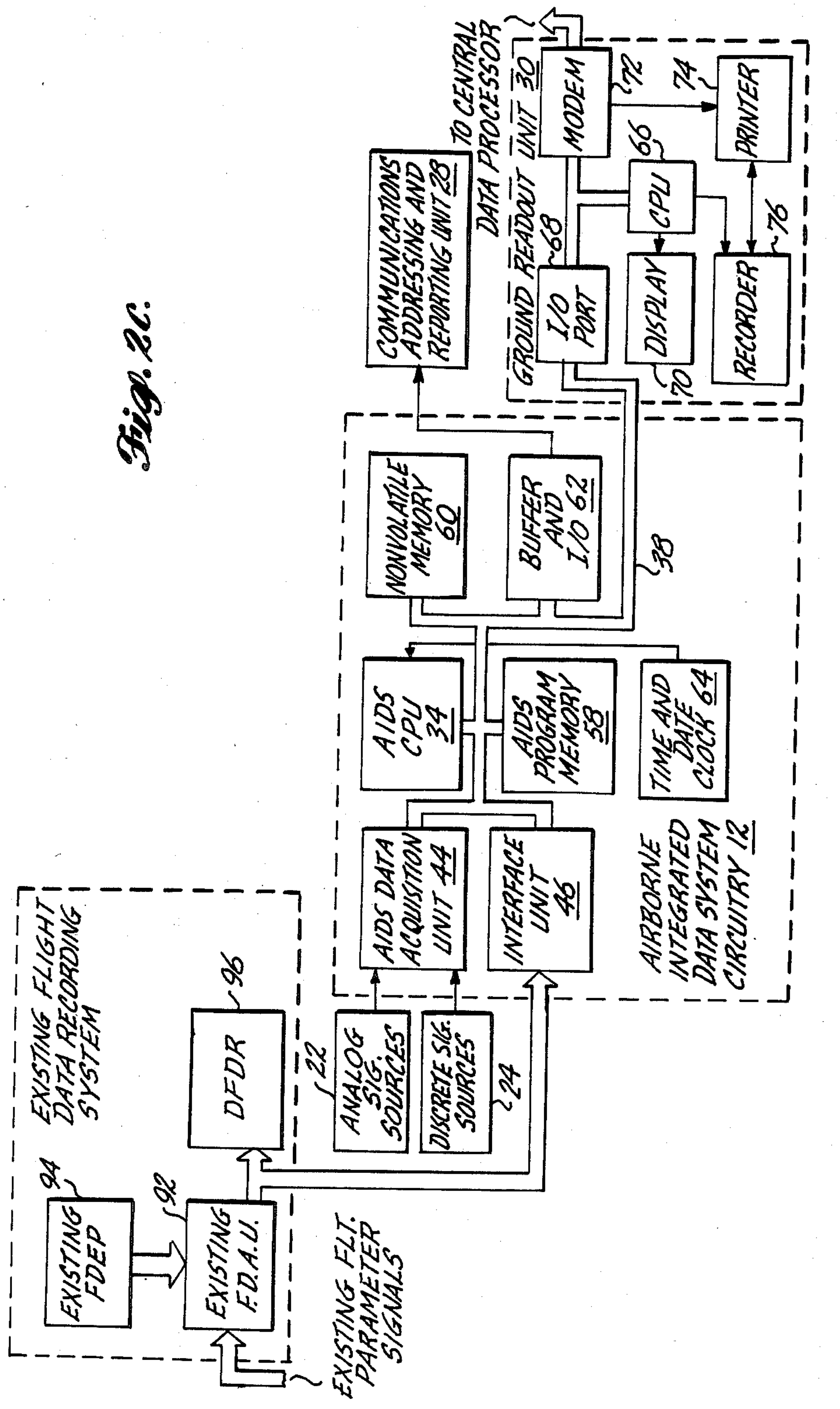

FIG. 2C illustrates use of airborne integrated data system circuitry 12 in conjunction with an existing aircraft flight data recorder. Typically, such an arrangement is utilized when a particular aircraft includes a modern flight data recorder system that records 11 or 16 flight parameters (e.g., consists of an ARINC Characteristic 573 Flight Data Acquisition Unit and an ARINC Characteristic 573 Digital Flight Data Recorder). As is indicated in FIG. 2C, the existing flight data acquisition unit 92 supplied digitally encoded signals representative of the parameters, recorded by the flight data recorder system to interface unit 46 of airborne integrated data systems circuitry 12. Additional flight parameters (e.g., engine condition monitoring parameters) are supplied to AIDS Data Acquisition Unit 44 by analog signal sources 22 and discrete signal sources 24. In the arrangement of FIG. 2C, airborne integrated data system circuitry 12 functions in the manner described relative to FIG. 1 to provide the desired performance and maintenance data via communications addressing and reporting unit 28 and/or ground readout unit 30.

Figure 3:
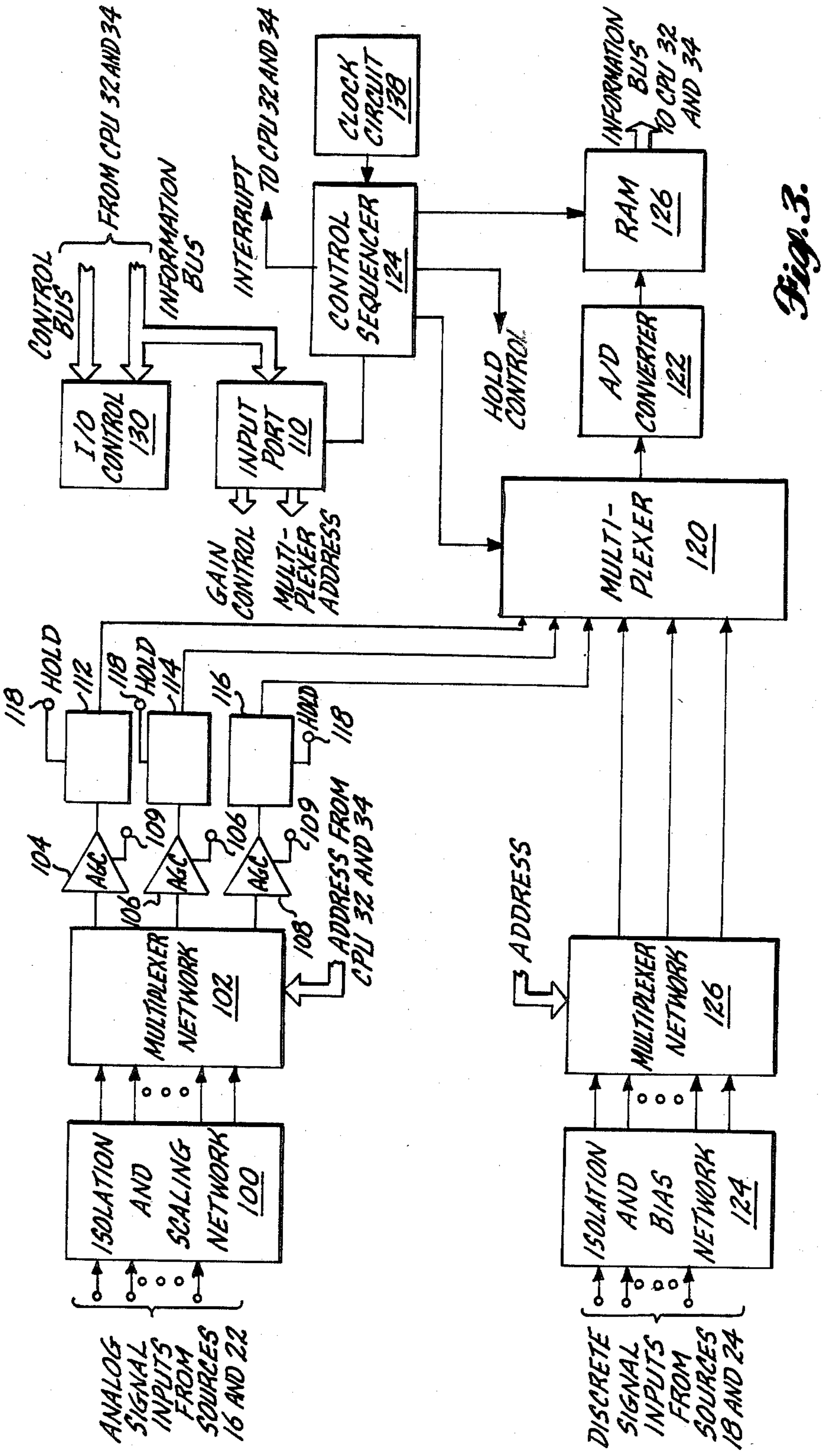
FIG. 3 schematically depicts the data acquisition circuits utilized in the flight data acquisition circuitry and airborne integrated data system circuitry of the preferred embodiment of the invention.

FIG. 3 is a block diagram which illustrates the circuit configuration of flight data acquisition unit 40 and AIDS data acquisition unit 44 of FIG. 1. As is shown in FIG. 3, each of the analog signals supplied by analog signal sources 16 and 22 are coupled to an isolation and scaling network 100 of the respective data acquisition unit (flight data acquisition unit 40 or AIDS data acquisition unit 44). Isolation scaling network 100 includes conventional arrangements of resistors and capacitors that are configured to ensure feedback fault isolation and to reduce the magnitude of each particular analog signal to a level that is compatible with the signal multiplexing and analog-to-digital conversion that is performed by the data acquisition units.

Each scaled (attenuated) analog signal supplied by isolation and scaling network 100 is coupled to an input terminal of an analog signal multiplexer network 102. In the currently preferred embodiments, multiplexer network 102 includes three separate multiplexers that allows flight data acquisition unit 40 and AIDS acquisition unit 44 to simultaneously process three of the analog signals supplied by isolation and scaling network 100. This is advantageous in that it reduces the number of command and interrupt signals that must pass between the data acquisition units (flight data acquisition 40 of flight recorder data acquisition circuitry 10 and AIDS data acquisition unit 44 of airborne integrated data system circuitry 12) and the associated CPUs (CPU 32 of flight data recorder data acquisition circuitry 10 and AIDS CPU 34 of airborne integrated data systems circuitry 12); hence reducing processing time and system overhead. Another advantage is that simultaneous sampling and processing of a set of three analog signals minimizing system error in processing 3-phase signals such as those provided by aircraft heading synchros and the like.

In any case, as is indicated in FIG. 3, address and command signals that cause multiplexer network 102 to select a specific set of analog signals is coupled to multiplexer network 102 by the associated CPU (flight data CPU 32 of flight data recorder data acquisition circuitry 10 or AIDS CPU 34 of airborne integrated data system circuitry 12). The three signals selected by means of multiplexer network 102 are coupled to the input terminals of gain controlled amplifiers 104, 106 and 108. Each gain controlled amplifier 104, 106 and 108 includes a gain control terminal 109 that is connected for receiving a gain control signal from an input/output port 110. As is indicated in FIG. 3, the gain control signals are supplied by the associated CPU (flight data CPU 32 or AIDS CPU 34). In accordance with the invention, flight data CPU 32 and AIDS CPU 34 are programmed to supply signals to the gain control terminals 109 that optimize the level of the signals supplied by gain controlled amplifiers 104, 106 and 108 relative to the hereinafter discussed analog-to-digital conversion that is performed by flight data acquisition unit 40 and AIDS data acquisition unit 44.

The signals supplied by gain controlled amplifiers 104, 106 and 108 are coupled to track and hold (sample and hold) circuits 112, 114 and 116, respectively. Each track and hold circuit 112, 114, and 116 is a conventional sampling circuit that in effect, stores the instantaneous value of an applied analog signal at the instant of time at which a "hold" signal is applied to a terminal 118 of the track and hold circuits. In the arrangement of FIG. 3, the signals stored by track and hold circuits 112, 113 and 116 are coupled to three input terminals of a multiplexer 120, which operates to supply a selected signal to an analog-to-digital converter 122.

As is indicated in FIG. 3, the discrete signal inputs supplied to flight data acquisition unit 40 by discrete signal sources 18 and the discrete signal input supplied to AIDS data acquisition unit 44 by discrete signal sources 24 are coupled to an isolation and bias network 124. Isolation and bias network 124 is similar to isolation and scaling network 100 in that it includes passive networks that isolate the signal sources from the data acquisition units. In addition, where required, isolation and bias network 124 adjusts the level of the supplied discrete signal (i.e., biases the discrete signal at a desired potential). The signals supplied by isolation and bias network 124 are coupled to a multiplexer 126, which receives address signals from input port 110. In the currently preferred embodiments of the invention, multiplexer network 126 is similar to multiplexer network 102 and includes three conventional analog multiplexer circuits such as the type HI-507A-8 integrated circuit that is manufactured by Harris Semiconductor Corporation. In such an arrangement, multiplexer 126 simultaneously supplies three signals representative of three of the discrete signal inputs each time a new set of address signals is made available by input port 110. As previously mentioned, these address signals are supplied by flight data CPU 32 and AIDS CPU 34.

In view of the above discussion, it can be noted that multiplexer 120 receives input signals that represent the magnitude of three discrete signal sources 18 or 24 and the instantaneous value of three analog signals supplied by analog signal sources 16 or 22. As is indicated in FIG. 3, multiplexer 120 is controlled by a control sequencer 124. In each analog-to-digital conversion operation that is effected by flight data acquisition unit 40 and AIDS data acquisition unit 44, control sequencer 124 supplies a signal to multiplexer 120 that causes multiplexer 120 to sequentially supply the signal supplied by track and hold circuits 112, 114 and 116 and/or the discrete signal supplied by multiplexer network 126 to the input terminals of an A/D (analog-to-digital) converter 122. In the currently preferred embodiments of the invention, A/D converter 122 is a commercially available type AD5215 analog-to-digital converter that produces a twelve bit output signal.

As is indicated in FIG. 3, each digital signal supplied by A/D converter 122 is coupled to a random access memory (RAM) 126 which operates under the control of control sequencer 124. As also is indicated in FIG. 3, control sequencer 124 receives command signals from CPU 32 and 34 via input port 110. In addition, a clock circuit 128 is connected to control sequencer 124 to control the sequencing and timing of multiplexer networks 102, 120 and 126 and, thereby, the analog-to-digital conversion process effected by flight data acquisition unit 40 and AIDS data acquisition unit 44. Further, as is indicated in FIG. 3, control sequencer 124 produces the "hold" signals that are applied to terminals 118 of track and hold circuits 112, 114 and 116 and supplies an interrupt signal to flight data CPU 32 and AIDS CPU 34 when RAM 126 contains digitally encoded signals respresentative of the selected parametric data.

To complete the description of FIG. 3, the signal selection commands supplied by flight data CPU 32 and AIDS CPU 34 are coupled to an Input/Output Control Circuit 130, which is a conventional circuit that decodes the command signals to determine the selected set of parameters.

In operation, the flight data acquisition unit 40 and AIDS data acquisition unit 44 depicted in FIG. 3 operate as follows.

The data acquisition unit is accessed by the associated CPU (flight data CPU 32 or AIDS CPU 34) by means of a command signal that is supplied to Input/Output Control 130. CPU supplied signals representing the gain control and selected parameters are coupled to gain controlled amplifiers 104, 106 and 108 into multiplexer networks 102 and 106 by input port 110. In response to these signals, multiplexer networks 102 and 126 supply the selected analog and discrete signals, with multiplexer 126 coupling the selected discrete signals directly to input terminals of multiplexer 120. The analog signals supplied by multiplexer network 102 are processed by control gain amplifiers 104, 106 and 108, with the gain of each amplifier being set by the signal supplied by flight data CPU 32 or AIDS CPU 34. Track and hold circuits 112, 114 and 116, each of which have been set to the "hold" condition by control sequencer 124 supply signals to multiplexer 120 that represent the instantaneous value of the selected analog signals.

In response to a signal supplied by input port 110, indicating that CPU 32 or 34 is requesting processed parametric data, control sequencer 124 couples signals supplied by clock circuit 128 to the control terminal of multiplexer 120. In response, multiplexer 120 sequentially supplies signal samples representing the instanteous value of the selected analog signals and the value of the selected discrete signals to analog-to-digital converter 122. When the analog-to-digital conversion process is complete, with digitally encoded signals representative of the selected parametric signals being stored in RAM 126, control sequencer 124 generates an interrupt signal. The CPU that requested the digitally encoded data (CPU 32 or CPU 34) then accesses the signals stored in RAM 126. When CPU 32 or CPU 34 reaches the next sequence step in which additional parametric data is required, a command signal is supplied to Input/Output Control 130 and the process is repeated.

A more detailed disclosure of the type of data acquisition circuit depicted in FIG. 3 can be had with reference to the previously mentioned U.S. patent application, Ser. No. 576,538, filed Feb. 3, 1984, and such disclosure is hereby incorporated by reference.

The arrangement and operation of the airborne integrated data system configuration of FIG. 1 can be understood by considering an illustrative embodiment in view of the previously described configuration of airborne integrated data system circuitry 12 and the above-described configuration and operation of AIDS data acquisition unit 44. In this regard, as is known to those skilled in the art, airborne integrated data systems can be used to monitor and record various parametric signals that can be processed and analyzed to provide information that is useful in determining the performance of various aircraft systems and thus useful in the maintenance of such systems. As previously mentioned, in accordance with the present invention, parametric data is selectively recorded to eliminate the monitoring and recording of nonrelevant or cumulative data and AIDS CPU 34 is sequenced to analyze the monitored parametric data and provide performance and maintenance information that is both useful and readily available to ground maintenance personnel.

As also is known to those skilled in the art, one of the primary applications of airborne integrated data systems is monitoring the condition of the aircraft engines and monitoring the performance of the aircraft and the flight crew during various flight maneuvers and procedures. As shall be described in detail in the following paragraphs, in the currently preferred embodiments of this invention, airborne integrated data system circuitry 12 automatically and selectively monitors and analyzes aircraft parametric data signals to provide information relative to engine condition and performance during: engine start and shut-down procedures; aircraft takeoff; and stabilized cruise. More specifically, during engine start and shut-down procedures, the currently preferred embodiments of the invention monitor the exhaust gas temperature (EGT) and engine speed (e.g., high pressure rotor speed, $N_2$), During this procedure, AIDS CPU 32 analyzes these monitored parameters to produce digital signals representative of the time required to reach a specific engine speed from initiation of the start or shut-down sequence, and the maximum EGT experience during the procedure. This information is then recorded in nonvolatile memory 60 of airborne integrated data system circuitry 12 of FIG. 1 for subsequent retrieval by ground readout unit 30 and/or is made available for radio transmission by communications addressing and reporting unit 28.

The currently preferred embodiments of the invention provide useful data during aircraft takeoff and cruise by automatically recording a set of data (i.e., a "snapshot") representative of monitored parameters that provide a measure of flight environment and engine performance. In this regard, in the currently preferred embodiments of the invention, to record an appropriate single data set during aircraft takeoff, AIDS CPU 34 monitors a discrete signal that indicates whether the aircraft is airborne (e.g., a "Weight on Wheels" or "WOW" signal that is provided by the aircraft squat switch). Upon expiration of a predetermined time delay (four seconds in the currently preferred embodiment of the invention), AIDS CPU 34 sequences to store signals representative of each monitored engine condition and flight environment parameter. In the currently preferred embodiments of this invention the parameters recorded can include; aircraft altitude; aircraft airspeed; engine ram air temperature (RAT), or static air temperature (SAT); engine pressure ratio for each engine (EPR); engine rotation speed ($N_1$ and/or $N_2$); engine exhaust gas temperature (EGT); fuel flow to each engine; oil temperature and pressure for each engine; and, engine PAC/Bleed discretes. In addition, documentary data such as time and date, aircraft gross weight and flight number is recorded to provide a basis for subsequently correlating the recorded data with the aircraft and the condition recorded.

The currently preferred embodiments of the invention also record a single set of parametric data that is similar to the data recorded during aircraft takeoff when the aircraft reaches a stabilized cruise. In these embodiments of the invention, AIDS CPU 34 detects stablized cruise by monitoring aircraft altitude, airspeed, thrust and ram air temperature (RAT). When each of the four monitored parameters remain within a predetermined range for a predetermined period of time (60 seconds in the currently preferred embodiments) AIDS CPU 34 stores digitally encoded signals representative of the flight environment and engine performance parameters in nonvolatile memory 60 of airborne integrated data system circuitry 12 (FIG. 1) and/or provides the digitally encoded signals for transmission to a ground station via communications addressing and reporting unit 28.

In addition to the above-discussed automatic monitoring and recording of engine condition, the currently preferred embodiments of the invention can be manually activated to record a full set of flight environment and engine performance parameters whenever the flight crew believes that the information will be useful to ground personnel (e.g., upon detecting unusual or irregular aircraft performance). Further, the currently preferred embodiments of the invention are configured and ararnged to automatically record digitally encoded signals representative of selected flight environment and engine condition parameters whenever the selected parameter being monitored exceeds a predetermined threshold or limit. In this regard, the currently preferred embodiments of the invention provide exceedance monitoring of up to 16 parameters. When AIDS CPU 34 detects that a monitored parameter is in exceedance, a series of data sets ("snapshots") that represent the value of all monitored parameters at three predetermined times prior to the exceedance (4, 8 and 12 seconds in the currently preferred embodiments of the invention) is stored in nonvolatile memory 60 of airborne integrated data system circuitry 12 of FIG. 1 the data are made available to communications addresing and reporting unit 28. If the parameter being monitored for exceedance continues to incrase or decrease so that it further exceeds the selected threshold and reaches a secondary limit or threshold, additional digital signals are supplied when the monitored parameter reaches the second threshold. In addition, regardless of whether or not the second threshold value is reached, AIDS CPU 34 supplies a set of digitally encoded signals that reflects the value of all monitored flight environment and engine condition parameters when the parameter being monitored for exceedance reaches its peak value.

Figure 4:
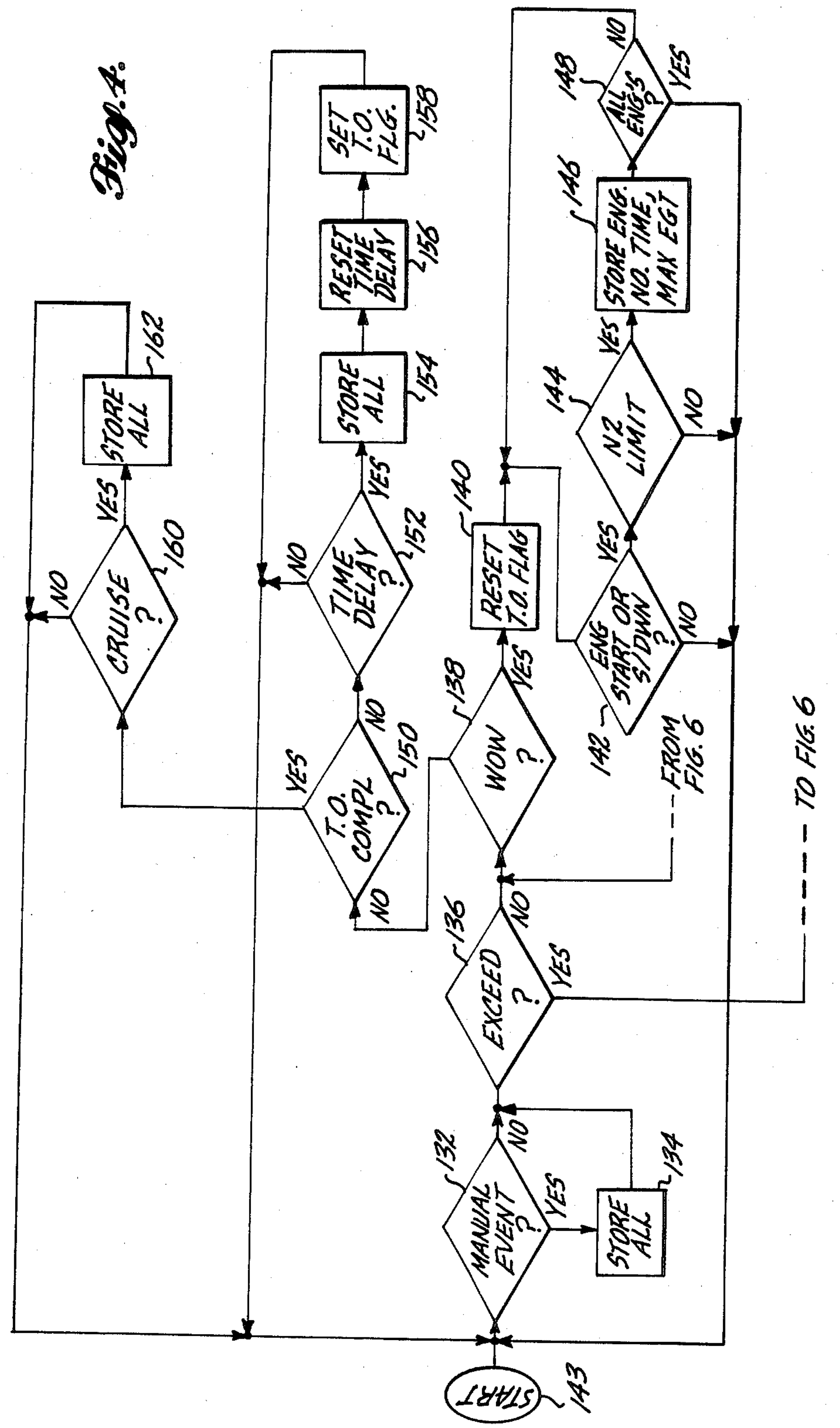
FIG. 4 is a flow chart that generally indicates the general sequencing of the invention with respect to operation thereof as an airborne integrated data system.
Figure 5:
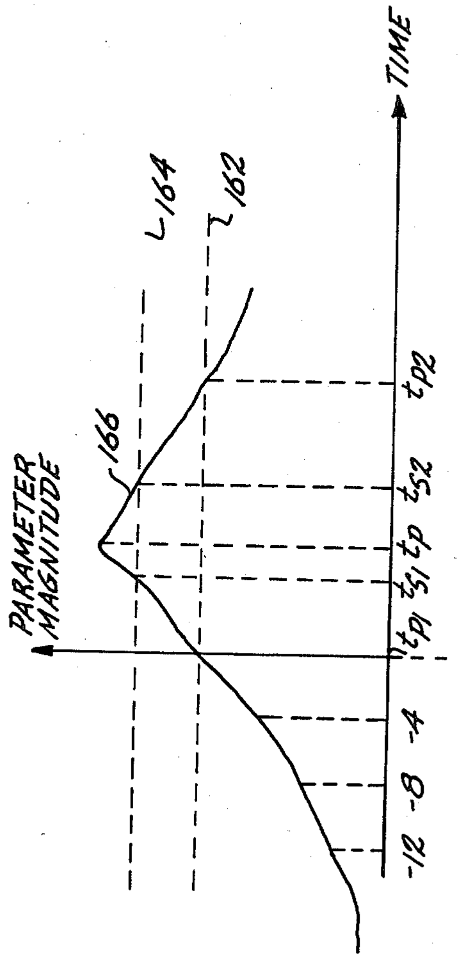
FIG. 5 depicts the manner in which the described embodiment of the invention operates to perform exceedance monitoring of selected parameters.
Figure 6:
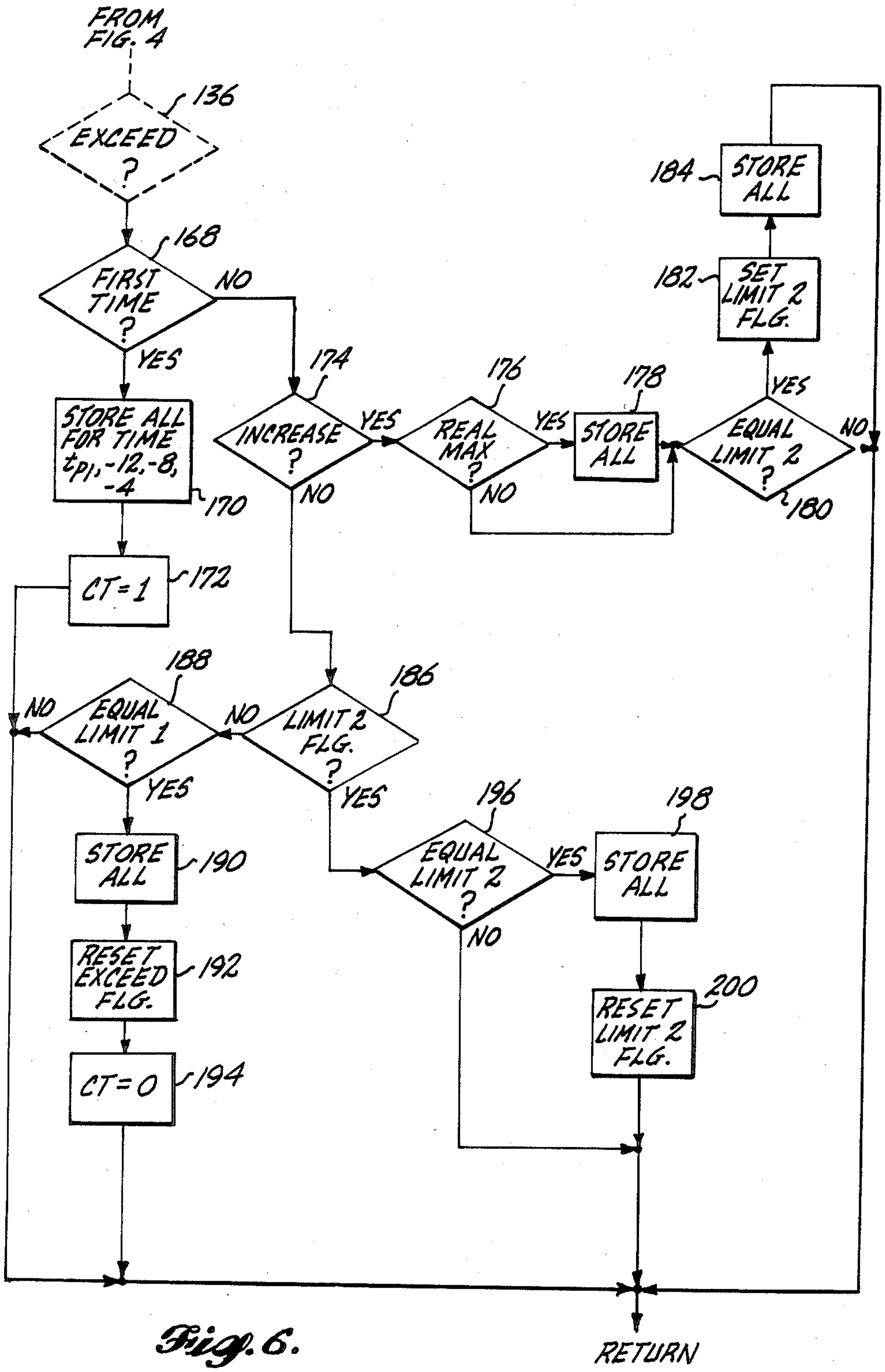
FIG. 6 is a flow chart that depicts an operational sequence that can be utilized to implement exceedance monitoring in accordance with FIG. 5.

The above-discussed operation of airborne integrated data systems circuitry 12 of FIG. 1 can be better understood with reference to the flowcharts of FIGS. 4 and 6 and FIG. 5, which graphically illustrates the exceedance monitoring characteristics of the preferred embodiments of the invention.

FIG. 4 is a flowchart that provides an example of the manner in which AIDS CPU 34 can be sequenced to effect the above described engine condition monitoring. In FIG. 4, the sequence begins by detecting whether the flight crew has requested the recording of the monitored engine performance and flight environment parameters (indicated at block 132 of FIG. 4). If the flight crew has initiated an event switch that is provided on flight data entry panel 56 of FIG. 1, CPU 34 processes the monitored parameters to supply digitally encoded signals that represent the monitored parameters in engineering units and stores the digitally encoded signals in nonvolatile memory 60 and/or provides the digitally encoded signals to communications addressing and reporting unit 28 (indicated at block 134 of FIG. 4). Once the digitally encoded signals have been provided, or if the manual event switch has not been activated, AIDS CPU 34 determines whether or not a parameter that is being monitored for exceedance has exceeded its threshold value (block 136 in FIG. 4). If one or more of the parameters that are being monitored for exceedance exceed the associated threshold, AIDS CPU 34 sequences in the manner that will be described relative to FIG. 6. If no exceedances are present, AIDS CPU 34 sequences to determine whether the aircraft is on the ground or is airborne. As is indicated at block 138, this is accomplished by determining whether a discrete signal that is supplied to AIDS data acquisition unit 44 by the aircraft squat switch indicates that the weight is being exerted on the aircraft wheels. In the event that the aircraft is on the ground, AIDS CPU 34 resets a takeoff flag, which is utilized to ensure that parametric data will be analyzed and recorded during the next most takeoff procedure (block 140 in FIG. 4). Next, AIDS CPU 34 determines whether or not an engine start or shutdown procedure is in progress (block 142). Typically this is determined by monitoring engine rotational speed (e.g., $N_2$) to detect whether the rotational speed is increasing from zero (engine startup) or decreasing from idle speed (engine shutdown). If a start or shutdown procedure is not in progress, AIDS CPU sequences to the beginning of the monitoring procedure (start block 143 in FIG. 4). If an engine start or shutdown procedure is in progress, AIDS CPU 34 determines whether engine rotational speed has reached a preselected limit (block 144). More specifically, in accordance with the invention, monitoring of the engine start procedure consists of determining the time required for engine rotational speed to increase from a first selected level (e.g., 15% of idle speed) to a second selected rotational speed (e.g., 50% of idle). In a similar manner, engine shutdown monitoring is effected by determining the time required for engine rotational speed to decrease from a first value (e.g., 50% of idle speed) to a second value (e.g., 15% of idle speed). In both cases, both the time required for the selected change in rotational speed and the maximum exhaust gas temperature of each engine is determined by AIDS CPU 34. As is indicated in FIG. 4, if the engine rotational speed limits have not been reached, AIDS CPU 34 recycles to the start of the depicted monitoring sequence. On the other hand, when the selected rotational speed is reached, AIDS CPU provides digitally encoded signals representative of the engine number, the time required for rotational speed to change between the selected limits and the maximum engine exhaust gas temperature during the rotational change (indicated at block 146 of FIG. 4). Next, AIDS CPU 34 sequences to determine whether engine start or shutdown information has been provided for each of the aircraft engines. If the monitored start or shutdown procedure is complete, AIDS CPU 34 recycles to the beginning of the monitoring sequence. On the other hand, if startup or shutdown procedure is still in effect with respect to one or more of the aircraft engines, AIDS CPU 34 recycles to the entry point of decisional block 142.

In the event it is determined at decisional block 138 that there is no weight on the aircraft wheels (aircraft airborne), AIDS CPU 34 determines whether or not takeoff information has been recorded for that particular flight leg. As is indicated at block 150 of FIG. 4, this can be accomplished by testing the takeoff flag discussed relative to block 140. If the takeoff flag indicates that no takeoff information is recorded, CPU 34 determines whether or not takeoff information should be recorded during that particular iteration. As is indicated at block 152 of FIG. 4, one method of determining the time at which takeoff information is recorded is to record parametric information a preselected time after AIDS CPU 34 detects that weight is no longer exerted on the aircraft wheels. In embodiments of the invention that are currently being developed and tested, parametric data representative of engine condition and flight environment is recorded four seconds after the aircraft leaves the runway. Other conditions can be monitored to determine the time at which takeoff parametric data is recorded. For example, such data can be recorded when it is determined at block 138 that the aircraft has left the runway and aircraft airspeed has reached a selected value. Regardless of the manner in which the system operates to determine the appropriate time to record parametric data during takeoff, once the selected condition is met, AIDS CPU 34 sequences to convert the monitored parametric data to engineering units and stores digitally encoded signals representative of the data in nonvolatile memory 60 of FIG. 1 and/or supplies the digitally encoded signals to communications addressing and reporting unit 28 (indicated at block 154 of FIG. 4). If the time at which takeoff data is recorded in determined by the time delay indicated at block 152 of FIG. 4, AIDS CPU 34 then resets the time delay (block 156). In any case, AIDS CPU 34 then resets the takeoff flag (block 158 in FIG. 4). so that the system will record takeoff information during the next flight leg. If there is no weight on the aircraft wheels (block 138) and takeoff data has been recorded (block 150), AIDS CPU 34 sequences to determine whether the aircraft has achieved stabilized cruise (indicated at block 160). As previously discussed, to determine whether stabilized cruise has been achieved, AIDS CPU 34 monitors selected aircraft parameters such as altitude, airspeed and engine thrust and RAM air temperature. When each monitored parameter remains relatively constant (does not deviate more than a selected amount) for a predetermined period of time (e.g., 60 seconds), AIDS CPU 34 supplies digitally encoded signals representative of the monitored engine and flight environment parameters (indicated at block 162 of FIG. 4). When the cruise data has been recorded, or if cruise has not been achieved, AIDS CPU 34 recycles to begin the next iteration of the sequence depicted in FIG. 4.

FIGS. 5 and 6 indicate the manner in which the currently preferred embodiments of the invention operate to monitor and analyze selected important engine parameters (e.g., engine rotational speed, exhaust gas temperature, thrust, etc.) and/or selected flight environment parameters (e.g., airspeed, vertical and horizontal acceleration, rate of change in heading, etc.) which indicate both the performance of the aircraft and the flight crew. As is indicated in FIG. 5, the exceedance monitoring provided by the currently preferred embodiments utilizes a primary threshold 162 and a second threshold 164. As previously discussed and as shall be described in more detail relative to FIG. 6, when the parameter being monitored (166 in FIG. 5) reaches the primary threshold 162, AIDS CPU 34 sets the previously mentioned exceedance flag to indicate an exceedance and supplies four sets of digitally encoded signals ("snapshots") that represent the values of all monitored engine performance and flight environment parameters (or a selected set thereof) at the time at which the monitored parameter reaches the primary threshold 162 (time $t_{p1}$ in FIG. 5) and at three earlier times (four, eight and twelve seconds prior to exceedance in FIG. 5). To provide the data at the three times that proceed the time at which an exceedance occurs, during each iteration of the monitoring sequence, AIDS CPU 34 stores appropriate information in random access memory. As shall be described relative to FIG. 6, if the monitored parameter exceeds the secondary limit 164, an additional set of digitally encoded signals that represents the monitored engine performance and flight environment parameters is provided by AIDS CPU 34 when the parameter being monitored for exceedance reaches the secondary limit (time $t_{s1}$) and provides another set of digitally encoded signals if the parameter being monitored for exceedance later decreases below secondary threshold 164 (time $t_{s2}$). Further, regardless of whether or not secondary threshold 164 is exceeded, AIDS CPU 34 supplies a set of digitally encoded signals representing the monitored flight environment and engine performance parameters when the parameter being monitored for exceedance reaches its peak value (time $t_p$ in FIG. 5) and provides an additional set of digitally encoded signals representing the monitored flight environment and engine performance parameters in the event that the magnitude of the parameter being monitored for exceedance again reaches primary threshold 162 (time $t_{p2}$ in FIG. 5).

As is indicated in FIG. 6, the above discussed exceedance monitoring can be effected in the following manner. When AIDS CPU 34 determines that an exceedance has occurred (block 136 of the sequence depicted in FIG. 4) a test is performed to determine whether or not it is the first iteration of the exceedance sequence. This is indicated at block 168 of FIG. 6 and consists of testing a flag CT which is initially zero and as discussed hereinafter, is set equal to one during the first iteration of the exceedance sequence. If it is the first iteration of the exceedance sequence (CT=0), AIDS CPU 34 sequences to store digitally encoded signals representing the monitored engine performance and flight environment parameters at the time of the current iteration and for four, eight and twelve seconds prior to the time at which the exceedance occurred. The flag CT is then set equal to one (at block 172) and AIDS CPU 34 sequences to reenter the basic system sequence of FIG. 4 at the junction between decisional blocks 136 and 138. If it is determined that it is not the first iteration of the exceedance sequence (CT=1 at decisional block 168), AIDS CPU 34 compares the current value of the parameter being monitored for exceedance with the value of that parameter during the previous iteration of the exceedance procedure (block 174 of FIG. 6). If the parameter being monitored for exceedance has increased since the previous iteration, AIDS CPU 34 next determines whether the current value exceeds the maximum value achieved during previous iterations (block 176). If the current value exceeds previously detected values, digitally encoded signals representative of all monitored flight environment and engine performance parameters are supplied to nonvolatile memory 60 of FIG. 1 and/or communications addressing and reporting unit 28. Once the digitally encoded signals have been provided, or if the value of the parameter being monitored for exceedance does not exceed all previously detected values, AIDS CPU 34 determines whether the current value is equal to the secondary threshold (164 in FIG. 5). This step of the sequence is indicated at block 180 of FIG. 6. If the secondary has not been exceeded, AIDS CPU 34 sequences to reenter the sequence of FIG. 4 at the previously indicated point. On the other hand, if the parameter being monitored for exceedance has reached the secondary threshold, AIDS CPU 34 sets a "flag" indicating that the secondary limit 164 has been reached (box 182 in FIG. 6). In addition, AIDS CPU 34 causes digitally encoded signals representative of all monitored flight environment and engine performance parameters to be supplied to nonvolatile memory 60 and/or communications addressing and reporting unit 28 (block 184 of FIG. 6). AIDS CPU 34 then sequences to reenter the sequence of FIG. 4 at the previously described point.

If it is determined at decisional block 174 that the value of the parameter being monitored for exceedance has not increased since the previous iteration, AIDS CPU 34 checks the flag indicating whether the secondary threshold was reached during a previous iteration (block 186 of FIG. 6). If the flag is not set (i.e., the parameter being monitored for exceedance was between the primary threshold 162 and the secondary threshold 164 during previous iterations), AIDS CPU 34 determines whether the magnitude of the parameter monitored for exceedance has decreased to the primary threshold (block 188 of FIG. 6). If the exceedance monitored parameter has not decreased to the primary threshold, AIDS CPU 34 sequences to reenter the sequence of FIG. 4 at the previously described point. If the magnitude of the exceedance monitored parameter has again reached the primary threshold 162, AIDS CPU 34 provides a set of digitally encoded signals representative of the monitored flight environment and engine parameters (block 190); resets the exceedance flag to indicate that that particular parameter is no longer in exceedance (block 192); sets the flag CT equal to zero and sequences to reenter the monitoring sequence of FIG. 4.

If it is determined at decisional block 186 that the value of the parameter being monitored for exceedance previously reached secondary threshold 164, AIDS CPU 34 determines whether the magnitude of the parameter being monitored for exceedance has decreased to secondary threshold 164 (block 196 of FIG. 6). If the magnitude of that parameter still exceeds secondary threshold 164, AIDS CPU 34 cycles to reenter the monitoring sequence of FIG. 4. On the other hand, if the magnitude of the parameter being monitored for exceedance has again reached secondary threshold 164, AIDS CPU 34 sequences to store digitally encoded signals representative of the monitored flight environment and engine parameters (block 198), resets the flag indicating that the magnitude of the parameter exceeds secondary limit 164 (box 200 of FIG. 6), and reenters the monitoring sequence of FIG. 4.

In addition to performing the engine start/shutdown, takeoff, cruise and exceedance monitoring discussed relative to FIGS. 4–6, the currently preferred embodiments of the invention are programmed to provide a landing report that indicates aircraft gross weight, the fuel consumed during that flight leg and the time at which the flight leg was completed or, alternatively, the elapsed time between engine start or takeoff and engine shutdown. In the currently preferred embodiments this information is determined by continually integrating the fuel flow to each engine during the flight leg to obtain the amount of fuel consumed and subtracting that value from the initial aircraft gross weight (obtained from data entered in by the flight crew by means of flight data entry panel 56 of FIG. 1, or obtained from the aircraft flight management system, if the aircraft is so equipped).

It also should be noted that the digitally encoded signals recorded by the currently preferred embodiments of the invention include documentary information that reveals the time at which each recorded event occurs and that identifies the aircraft and the particular flight. Time of occurrence is provided by time and data clock 64 of FIG. 1, or, if available, from an existing time and date source. In the currently preferred embodiments, aircraft identification (e.g., "tail number") is made available to AIDS CPU 34 by means of jumpered pins in the aircraft connector for airborne integrated data system circuitry 12. In effect, this provides a parallel format digitally encoded signals that can be serially accessed by AIDS CPU 34. Flight number is provided in the currently preferred embodiments by a counter circuit that is reset whenever data is retrieved via ground readout unit 30 and is incremented by AIDS CPU 34 each time a takeoff monitoring sequence is effected.

When the invention is configured to operate in the manner described relative to FIGS. 4–6, utilizing a 64 kilobit memory for nonvolatile memory 60 of FIG. 1 generally provides storage of engine start, takeoff, cruise and landing information for up to 45 separate flight segments of a twin engine aircraft, if no exceedances occur. Since an exceedance can require recording of eight sets of digitally encoded signals, one exceedance per flight segment can decrease the system storage capability to approximately seven flight segments. When a greater storage capacity or utilization in an aircraft having more than two engines is desired, the size of nonvolatile memory unit 60 can easily be increased (e.g., two 64 kilobit memorys can be employed).

Regardless of the memory capacity of nonvolatile memory 60, the currently preferred embodiments of the invention include display indicators that are mounted on the front panel of the unit that houses airborne integrated data system 12 to provide ground support personnel with an indication of the status of nonvolatile memory 60. In this regard, AIDS CPU 34 counts the number of sets of digitally encoded signals that are transferred to nonvolatile memory 60 and energizes a first indicator when a predetermined portion of the memory has been utilized since retrieval of data by ground readout unit 30 (e.g., 75% of the available memory space). Additionally, AIDS CPU 34 of the currently preferred embodiments energizes a second indicator whenever the flight crew activates the event switch of flight data entry panel 56 to initiate recording of flight data.

While a preferred embodiment of the invention has been described in detail, it should be apparent to those skilled in the art that various modifications and changes can be made without departing from the scope and spirit of the invention.

The embodiments of the invention in which an exclusive property or privilege is claimed are defined as follows:

1. An aircraft data acquisition and recording system for supplying retrievable digitally encoded signals representative of a pluralty of applied parametric flight data and aircraft performance signals, said plurality of parametric flight data and aircraft performance signals including analog signals and discrete signals, said aircraft data acquisition and recording system comprising:

a data acquisition unit having a plurality of input ports, each input port being connected for receiving one of said applied parametric flight data and aircraft performance signals, said data acquisition unit including means for sequentially accessing selected ones of said applied parametric flight data and aircraft performance signals and for processing each accessed signal in response to an applied command signal, said data acquisition unit forther including means for supplying a digitally encoded signal representative of each accessed parametric flight data and aircraft performance signal;

a central processing unit connected for receiving each of said digitally encoded signals supplied by said data acquisition unit, said data acquisition unit being responsive to program instructions to sequentially supply said command signals to said data acquisition unit and being responsive to program instructions to detect the time at which a plurality of predetermined aircraft procedures are undertaken, said central processing unit further being responsive to program instructions to process said digitally encoded signals supplied by said data acquisition unit to supply a single set of digitally encoded signals representative of selected aircraft performance information each time a procedure of said plurality of predetermined aircraft procedures is undertaken;

program memory means for storage of said program instructions, said program memory means being connected to said central processing unit, said program memory means including programmable read only memory for storing program instructions that sequence said central processing unit for adapting said data acquisition unit to the specific parametric flight data and aircraft performance signals applied to said data acquisition unit, said program memory means further including memory for storing program instructions for sequencing said central processing unit for sequential access and processing of selected ones of said parametric flight data and aircraft performance signals; and nonvolatile memory means for temporary storage of the sets of digitally encoded signals supplied by said central processing unit.

2. The aircraft data acquisition and recording system of claim 1 further comprising a portable ground readout unit connectable to said central processing unit and said nonvolatile memory for retrieving said sets of digitally encoded signals stored in said nonvolatile memory means.

3. The aircraft data acquisition and recording system of claim 2 further comprising a communications addressing and reporting unit coupled to said central processing unit, said communications addressing and reporting unit including means for storing said sets of digitally encoded signals and for transmitting signals representative of said sets of digitally encoded signals to a ground station while the aircraft employing said aircraft data acquisition and recording system is airborne.

4. The aircraft data acquisition and recording system of claim 1 wherein said nonvolatile memory means of said program memory means includes program instructions for sequencing said associated central processing unit for monitoring selected ones of said applied parametric flight data and aircraft performance signals for exceedance of at least one predetermined threshold level.

5. The aircraft data acquisition recording system of claim 4 wherein said selected flight data and aircraft performance signals are monitored for exceedance of two distinct threshold levels and said instructions stored in said program memory means sequence said associated central processing unit for supplying digitally encoded signals representative of the value of a selected set of said engine condition signals and flight environment signals at least one predetermined time before the signal being monitored for exceedance reaches the first one of said two distinct threshold levels, at the time said signal being monitored for exceedance reaches said first distinct threshold level, at the time said signal being monitored for exceedance reaches its peak magnitude, at the time said signal being monitored for exceedance reaches the second one of said two distinct threshold levels, and at any subsequent time that the signal being monitored for exceedance again reaches either said second threshold level or said first threshold level.

6. The aircraft data acquisition and recording system of claim 1 wherein said selected aircraft procedures include the start procedure for one or more engines that power the aircraft and wherein said parametric flight data and aircraft performance signals supplied to said data acquisition unit include a signal representative of the rotational speed of each said aircraft engine and the exhaust gas temperature of each such engine; said program memory means further storing program instructions for sequencing said central processing unit for supplying a digitally encoded signal set representative of the time required to reach a predetermined rotational speed and the maximum exhaust gas temperature attained during the time required to meet said predetermined rotational speed.

7. The aircraft data acquisition and recording system of claim 6 wherein said predetermined aircraft procedures include aircraft takeoff and wherein said parametric flight data and aircraft performance signal supplied to said data acquisition unit include a signal indicating that said aircraft is airborne; said program instructions stored in said program memory means including program instructions for sequencing said central processing unit for determining whether said aircraft is executing a takeoff procedure and, in the event said aircraft is executing a takeoff procedure, for sequencing said central processing unit to produce a single set of digitally encoded signals representing at least a portion of said parametric flight data and aircraft performance signals at a predetermined instant of time during said takeoff procedure.

8. The aircraft data acquisition and recording system of claim 7 wherein said parametric flight data and aircraft performance signal supplied to said data acquisition unit include a plurality of signals which collectively indicate whether said aircraft has attained a stabilized cruise condition; said program instructions stored in said program memory means further including program instructions for sequencing said central processing unit for determining whether said aircraft has attained stabilized cruise and for sequencing said central processing unit for supplying a digitally encoded signal representative of at least a portion of said parametric flight data and aircraft performance signals at a particular instant of time following attainment of stabilized cruise.

9. The aircraft data acquisition and recording system of claim 8 wherein said parametric flight data and aircraft performance signals include signals representative of the altitude of said aircraft, the airspeed of said aircraft, and the thrust and ram air temperature of each engine that powers said aircraft; said central processor unit being sequenced to determine attainment of stabilized cruise by sequentially monitoring the parametric signals representative of altitude, airspeed, thrust and ram air temperature and for supplying said digitally encoded signal representative of at least a portion of said parametric flight data and aircraft performance signals when the deviation of said signals representative of altitude, airspeed, thrust and ram air temperature all remain within predetermined limits for a predetermined period of time.

10. The aircraft data acquisition and recording system of claim 8 wherein said program memory means includes program instructions for sequencing said associated central processing unit for monitoring selected ones of said applied parametric flight data and aircraft performance signals for exceedance of at least one predetermined threshold level.

11. The aircraft data acquisition recording system of claim 10 wherein said selected flight data and aircraft performance signals are monitored for exceedance of two distinct threshold levels and said instructions stored in said program memory means sequence said associated central processing unit for supplying digitally encoded signals representative of the value of a selected set of said engine condition signals and flight environment signals at least one predetermined time before the signal being monitored for exceedance reaches the first one of said two distinct threshold levels, at the time said signal being monitored for exceedance reaches said first distinct threshold level, at the time said signal being monitored for exceedance reaches its peak magnitude, at the time said signal being monitored for exceedance reaches the second one of said two distinct threshold levels, and at any subsequent time that the signal being monitored for exceedance again reaches either said second threshold level or said first threshold level.

12. The aircraft data acquisition recording system of claim 8 wherein said plurality of predetermined aircraft procedures further includes landing of said aircraft and wherein said plurality of parametric flight data and aircraft performance signals includes a signal representative of the aircraft gross takeoff weight for the flight that was initiated immediately prior to a particular landing and signals representative of the fuel flow rate to each engine that powers said aircraft; said central processing unit being further responsive to program instructions for periodically monitoring said signals representative of fuel flow to each of said engines to periodically determine the weight of the fuel expended by each of said engines; said central processor supplying a signal representative of the total fuel expended during the flight that precedes each detected landing procedure each time said central processor detects landing of said aircraft.

13. The aircraft data acquisition and recording system of claim 12 further comprising:

output signal interface means connected for receiving sets of said digitally encoded signals supplied by said central processing unit, said output signal interface means being adapted for supplying at least a portion of said sets of retrievable digitally encoded signals to an existing aircraft flight data recorder.

14. The aircraft data acquisition and recording system of claim 1 wherein said predetermined aircraft procedures include aircraft takeoff and wherein said parametric flight data and aircraft performance signal supplied to said data acquisition unit include a signal indicating that said aircraft is airborne; said program instructions stored in said program memory means including program instructions for sequencing said central processing unit for determining whether said aircraft is executing a takeoff procedure and, in the event said aircraft is executing a takeoff procedure, for sequencing said central processing unit to produce a single set of digitally encoded signals representing at least a portion of said parametric flight data and aircraft performance signals at a predetermined instant of time during said takeoff procedure.

15. The aircraft data acquisition and recording system of claim 1 wherein said parametric flight data and aircraft performance signal supplied to said data acquisition unit include a plurality of signals which collectively indicate whether said aircraft has attained a stabilized cruise condition; said program instructions stored in said program memory means further including program instructions for sequencing said central processing unit for determining whether said aircraft has attained stabilized cruise and for sequencing said central processing unit for supplying a digitally encoded signal set representative of at least a portion of said parametric flight data and aircraft performance signals at a particular instant of time following attainment of stabilized cruise.

16. The aircraft data acquisition and recording system of claim 15 wherein said parametric flight data and aircraft performance signals include signals representative of the altitude of said aircraft, the airspeed of said aircraft, and the thrust and ram air temperature of each engine that powers said aircraft; said central processing unit being sequenced to determine attainment of stabilized cruise by sequentially monitoring the parametric signals representative of altitude, airspeed, thrust and ram air temperature and for supplying said digitally encoded signal representative of at least a portion of said parametric flight data and aircraft performance signals when the deviation of said signals representative of altitude, airspeed, thrust and ram air temperature all remain within predetermined limits for a predetermined period of time.

17. The aircraft data acquisition and recording system of claim 1 further comprising:

input signal interface means for receiving digitally encoded signals from an existing aircraft flight data acquisition unit, said input signal interface means being connectable for supplying digitally encoded signals to said central processing unit.

18. The aircraft data acquisition and recording system of claim 17 further comprising a portable ground readout unit connectable to said central processing unit and said nonvolatile memory means for retrieving said retrievable digitally encoded signals.

19. The aircraft data acquisition and recording system of claim 1 wherein said data acquisition unit includes first and second data acquisition means and said central processing unit includes first and second central processing means respectively connected to said first and second data acquisition means, and wherein said program memory means includes first and second programmable read only memory units respectively connected to said first and second central processing means; said first data acquisition means, said first central processing means and said first programmable read only memory unit being adapted for interconnection with an existing digital flight data recorder unit for supplying said retrievable digitally encoded signals supplied by said first central processing means to said existing digital flight data recorder unit; said second data acquisition means, said second central processing means and said second programmable read only memory unit being adapted for storing said retrievable digitally encoded signals supplied by said second central processing means in memory locations of said nonvolatile memory mens.

20. The aircraft data acquisition and recording system of claim 19 wherein said supplied parametric flight data and aircraft performance signals include a signal representative of the rotational speed of each engine of said aircraft and a signal representative of the exhaust gas temperature of each of said engines; said second signal processing means being configured and programmed for detecting the occurrence of engine start procedures by monitoring said signal representative of the rotational speed of each of said engines and detecting a predetermined change in rotational speed; said second central processing means being further configured and programmed for supplying a signal representative of the time required for the rotational speed of each of said engines to change by a predetermined amount and a signal representative of the maximum exhaust gas tempeature of each said engine during the time required for the rotational speed of each said engine to change said predetermined amount as one of said sets of digitally encoded signals.

21. The aircraft data acquisition and recording system of claim 20 wherein said plurality of predetermined aircraft procedures includes aircraft takeoff and wherein said parametric flight data and aircraft performance signals supplied to said second data acquisition means includes a signal indicating that said aircraft is airborne; said second data processing means being configured and programmed for detecting said signal indicating that said aircraft is airborne to detect that said aircraft is executing a takeoff procedure and, in the event said aircraft is executing a takeoff procedure, for sequencing said second signal processing means to provide a single set of digitally encoded signals representing at least a portion of said parametric flight data and aircraft performance signals at a predetermined instant of time during said takeoff procedure.

22. The aircraft data acquisition and recording system of claim 20 wherein said parametric flight data and aircraft performance signals supplied to said second data acquisition means include a plurality of signals which collectively indicate whether said aircraft has attained a stabilized cruise condition; said second central processing means being configured and programmed for sequencing said second central processing means to determine whether said aircraft has attained stabilized cruise and for sequencing said second central processing means for supplying a digitally encoded signal set representative of at least a portion of said parametric flight data and aircraft performance signals at a particular instant of time following attainment of stabilized cruise.

23. The aircraft data acquisition and recording system of claim 22 wherein said parametric flight data and aircraft performance signals include signals representative of the altitude of said aircraft, the airspeed of said aircraft and the thrust and ram air temperature of each engine that powers said aircraft; said second central processing means being configured and programmed to determine attainment of stabilized cruise by sequentially monitoring the parametric signals representative of altitude, airspeed, thrust and ram air temperature and being configured and programmed for supplying said digitally encoded signal set representative of at least a portion of said parametric flight data and aircraft performance signals when the deviation of said signals representative of altitude, airspeed, thrust and ram air temperature all remain within predetermined limits for a predetermined period of time.

24. The aircraft data acquisition and recording system of claim 22 wherein said second central processing means is configured and programmed for monitoring selected ones of said selected flight data and aircraft performance signals for exceedance of two distinct threshold levels; and second central processing means being configured and programmed for supplying digitally encoded signals representative of the value of a selected set of said parametric flight data and aircraft performance signals at least one predetermined time before the signal being monitored for exceedance reaches the first one of said two distinct threshold levels, at the time said signal being monitored for exceedance reaches said first distinct threshold level, at the time said signal being monitored for exceedance reaches its peak magnitude, at the time said signal being monitored for exceedance reaches the second one of said two distinct threshold levels, and at any subsequent time that the signal being monitored for exceedance again reaches one of said first and second distinct threshold levels.

25. The aircraft data acquisition and recording system of claim 22 wherein said plurality of predetermined aircraft procedures further includes landing of said aircraft and wherein said plurality of parametric flight data and aircraft performance signals supplied to said second data acquisition means includes a signal representative of the aircraft gross takeoff weight for the flight that was initiated immediately prior to a particular landing and signals representative of the fuel flow rate to each engine that powers said aircraft; said second central processing means being responsive to program instructions for periodic monitoring of said signals representative of fuel flow to each of said engines and for determining the weight of the fuel expended by each of said engines; said second central processing means supplying a signal representative of the total fuel expended during the flight that precedes each detected landing procedure each time said second central processing means detects a landing of said aircraft.

* * * * *